(12) United States Patent
Han

(10) Patent No.: US 11,611,688 B2
(45) Date of Patent: *Mar. 21, 2023

(54) CAMERA MODULE

(71) Applicant: LG INNOTEK CO., LTD., Seoul (KR)

(72) Inventor: Sang Yeal Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,287

(22) Filed: Sep. 16, 2021

(65) Prior Publication Data

US 2022/0006928 A1 Jan. 6, 2022

Related U.S. Application Data

(63) Continuation of application No. 16/623,446, filed as application No. PCT/KR2018/007568 on Jul. 4, 2018, now Pat. No. 11,159,701.

(30) Foreign Application Priority Data

Jul. 4, 2017 (KR) .................. 10-2017-0084701
Jul. 4, 2017 (KR) .................. 10-2017-0084702
(Continued)

(51) Int. Cl.
*H04N 5/225* (2006.01)

(52) U.S. Cl.
CPC .......... *H04N 5/2252* (2013.01); *H04N 5/2253* (2013.01)

(58) Field of Classification Search
None
See application file for complete search history.

(56) References Cited

U.S. PATENT DOCUMENTS 9,491,342 B2   11/2016  Winter et al.
11,159,701 B2 * 10/2021  Han .................. H04N 5/22521
(Continued)

FOREIGN PATENT DOCUMENTS

CN   1591992    3/2005
CN   105959522  9/2016
(Continued)

OTHER PUBLICATIONS

Korean Office Action dated Jun. 11, 2021 issued in KR Application No. 10-2017-0084701.
(Continued)

*Primary Examiner* — James M Hannett
(74) *Attorney, Agent, or Firm* — Ked & Associates LLP

(57) ABSTRACT

The present embodiment relates to a camera module comprising a front body, a lens, a rear body, a first substrate, an image sensor, a second substrate, a connector and a cover, wherein the cover includes a bottom plate having a hole in which the connector is to be disposed, side plates extending from the bottom plate, and pressing unit disposed at the bottom plate and elastically supporting the connector, the connector includes a first surface facing the inner surface of the bottom plate of the cover, and a second surface extending from the first surface and disposed in the hole, and the pressing unit includes a first pressing part for pressing the first surface of the connector, and a second pressing part for pressing the second surface of the connector.

20 Claims, 20 Drawing Sheets

(30) Foreign Application Priority Data

Jul. 4, 2017 (KR) ........................ 10-2017-0084703
Jul. 4, 2017 (KR) ........................ 10-2017-0084704

(56) References Cited

U.S. PATENT DOCUMENTS

| | | | | |
|---|---|---|---|---|
| 2005/0048829 | A1* | 3/2005 | Nishio | H04N 5/2253 348/E5.025 |
| 2010/0091179 | A1* | 4/2010 | Murakami | H01R 12/714 348/374 |
| 2012/0155852 | A1 | 6/2012 | Hou | |
| 2014/0320657 | A1 | 10/2014 | Han et al. | |
| 2015/0189137 | A1* | 7/2015 | Han | H04N 5/2257 348/374 |
| 2015/0340816 | A1* | 11/2015 | Abe | H01R 24/38 439/607.34 |
| 2017/0320449 | A1 | 11/2017 | Park | |
| 2018/0183177 | A1* | 6/2018 | Yamanaka | H01R 13/648 |

FOREIGN PATENT DOCUMENTS

| | | |
|---|---|---|
| DE | 10 2015 110262 | 12/2016 |
| EP | 2 373 001 | 10/2011 |
| JP | 58187907 | 11/1983 |
| JP | 2002-056938 | 2/2002 |
| JP | 2005-073130 | 3/2005 |
| JP | 2011-139305 | 7/2011 |
| JP | 2015-210292 | 11/2015 |
| JP | 2017-102338 | 6/2017 |
| KR | 10-2008-0021887 | 3/2008 |
| KR | 10-2009-0105062 | 10/2009 |
| KR | 10-2013-0050767 | 5/2013 |
| KR | 10-2013-0056435 | 5/2013 |
| KR | 10-2014-0059181 | 5/2014 |
| KR | 10-2016-0065530 | 6/2016 |
| KR | 10-1705525 | 2/2017 |
| WO | WO 2016/076619 | 5/2016 |
| WO | WO 2017/097658 | 6/2017 |

OTHER PUBLICATIONS

Korean Office Action dated Jun. 11, 2021 issued in KR Application No. 10-2017-0084703.
International Search Report dated Oct. 8, 2018 issued in Application No. PCT/KR2018/007568.
European Search Report dated Apr. 16, 2020 issued in Application No. 18829121.5.
Chinese Office Action dated Mar. 1, 2021 issued in Application 201880044705.X.
Korean Office Action dated Aug. 7, 2021 issued in KR Application No. 10-2017-0084702.
European Search Report dated May 3, 2022 issued in EP Application No. 21196055.4.
Japanese Office Action dated May 10, 2022 issued in JP Application No. 2019-572091.
Korean Office Action dated Jun. 8, 2022 issued in KR Application No. 10-2022-0026813.
Korean Office Action dated Jul. 29, 2022 issued in KR Application No. 10-2022-0030362.
Japanese Notice of Allowance dated Nov. 1, 2022 issued in JP Application No. 2019-572091.

* cited by examiner

CAMERA MODULE

CROSS-REFERENCE TO RELATED APPLICATIONS

This application is a Continuation Application of U.S. patent application Ser. No. 16/623,446 filed Dec. 17, 2019, which is a U.S. National Stage Application under 35 U.S.C. § 371 of PCT Application No. PCT/KR2018/007568, filed Jul. 4, 2018, which claims priority to Korean Patent Application Nos. 10-2017-0084701, 10-2017-0084702, 10-2017-0084703 and 10-2017-0084704, all of which were filed Jul. 4, 2017, whose entire disclosures are hereby incorporated by reference.

TECHNICAL FIELD

The teachings in accordance with exemplary and non-limiting embodiments of this invention relate generally to a camera module.

BACKGROUND ART

This section provides background information related to the present invention, which is not necessarily prior art.

The camera module capturing a subject in a photograph or an image may be mounted on various devices and pieces of equipment. Inter alia, vehicles mounted with camera modules have been marketed. The camera module may be used on a vehicle as front and rear monitoring cameras, black boxes and the like.

Meantime, a structure is required to mount a camera module when the camera module is to be mounted on a vehicle. Furthermore, a solid strong sealing is required in case of assembling parts to thereby prevent foreign objects from being introduced into the camera module, because a part of the camera module is exposed outside of the vehicle when mounted on a vehicle.

Furthermore, a camera module mounted on a vehicle is disposed therein with a plurality of substrates, where a structure is also required to fix the plurality of substrates inside the camera module while being discretely disposed. In addition, when a camera module is mounted on a vehicle, a structure is further required to fix a connector extended from a substrate and shielding electromagnetic waves generated from inside the camera module.

DETAILED DESCRIPTION OF THE INVENTION

Technical Subject

The exemplary embodiment of the present invention is to provide a camera module including a coupling structure (bracket) in order to mount a camera module on a vehicle.

The exemplary embodiment of the present invention is also to provide a camera module coupled to a vehicle in a solid sealing structure.

The exemplary embodiment of the present invention is further to provide a camera module including a structure supporting a plurality of substrates in a discrete state.

In addition, the exemplary embodiment of the present invention is to provide a camera module including a cover fixing a connector extended from a substrate and shielding electromagnetic waves generated from inside of the camera module.

Technical Solution

A camera module according to an exemplary embodiment may comprise: a front body; a lens disposed on the front body; a rear body coupled to the front body; a first substrate disposed at an inner space between the front body and the rear body; an image sensor disposed on the first substrate; a second substrate spaced apart from the first substrate in the inner space and electrically connected to the first substrate; and a bracket coupled to an outer surface of the rear body, wherein the outer surface of the rear body includes a first surface disposed at an opposite side of the front body, and a second surface connecting the first surface and the front body, and wherein the rear body includes a protrusion disposed on the second surface, and wherein the bracket includes a bottom part facing the first surface of the rear body, a pressing part disposed on the floor part to press a first surface of the rear body, a side part disposed on a second surface of the rear body, and a hook disposed on the side part to be hitched by the protrusion.

The pressing part may include a first pressing part disposed to a first direction and a second pressing part disposed to a second direction different from the first direction.

The first direction may be perpendicular to the second direction.

The protrusion may include first and second protrusion each spaced apart on the second surface of the rear body, and the hook may include a first hook hitched by the first protrusion and a second hook hitched by the second protrusion, and the rear body may further include a rib disposed between the first hook and the second hook, and a width of the rib may correspond to a discrete distance between the first hook and the second hook.

An outer surface of rear body may further include a third surface disposed opposite to the second surface, the protrusion may include a first protrusion disposed on a second surface of rear body and a second protrusion disposed on a third surface of the rear body, and the hook may include a first hook hitched by the first protrusion and a second hook hitched by the second protrusion.

An outer surface of the rear surface may include a fourth surface and a fifth surface disposed between and opposite to the second surface and the third surface, and the side part of the bracket may include a coupling part respectively disposed on the fourth surface and the fifth surface and including a hole.

The protrusion may include a sixth surface hitched by the hook and a seventh surface connecting the sixth surface and the second surface of the rear body, and the seventh surface may slantly connect the sixth surface of protrusion and the second surface of the rear body.

The pressing part may include a first extension part integrally formed with the bottom part, and extended from the bottom part toward a first surface of the rear body, and a contact part extended from the first extension part to contact a first surface of the rear body, and a second extension part extended from the contact part toward a direction distancing from the first surface of the rear body.

The camera module may further comprise a connector extended from the second substrate to pass through the rear body, and the bottom part of the bracket may include a hole passed through by the connector.

A camera module according to an exemplary embodiment may comprise: a front body assembly including a lens; a rear body coupled to the front body assembly; a first substrate disposed at an inner space between the front body assembly and the rear body assembly; a second substrate disposed in the inner space by being spaced apart from the first substrate and electrically connected to the first substrate; and a bracket coupled to an outside of the rear body, wherein the rear body may include a first protrusion and a second protrusion disposed at an outer side surface of rear body, each disposed at an opposite side, and the bracket may include a bottom part facing a rear surface of rear body, a pressing part disposed on the bottom part to press a rear surface of the rear body toward a front side, and a hook extended from the bottom part to be respectively hitched by the first protrusion and the second protrusion.

A camera module according to an exemplary embodiment may comprise: a front body; a barrel disposed on the front body; a lens disposed on the barrel; a rear body coupled to the front body; a substrate disposed at an inner space between the front body and the rear body; and an image sensor disposed on the substrate, wherein the front body may include a first surface facing the rear body, and a first protrusion and a second protrusion protruded from the first surface and mutually spaced apart from the other, and wherein the first protrusion may be disposed at an inside of the second protrusion to allow being nearer to an optical axis than the second protrusion, and the first protrusion may be coupled with the substrate, and the second protrusion may be coupled with the rear body, and the front body may further include a plurality of ribs connecting the first protrusion and the second protrusion between the first protrusion and the second protrusion, where each of the plurality of ribs is spaced apart.

The second protrusion may include a bottom part spaced apart from an outer circumference of the first surface of the front body, and the rear body may include a bottom part spaced apart from the front body, and a side part extended from the bottom part toward the front body, wherein the side part of the rear body may include a second surface facing the front body, a second protrusion protruded from the second surface, a third protrusion protrused from the second surface and disposed at a position corresponding to that between the second protrusion and the outer circumference of the first surface at the front body, and a fourth protrusion slantly connecting an inner surface of the third protrusion and the second surface, and the front body and the rear body may be coupled by allowing the second protrusion and the fourth protrusion to be fused.

The second protrusion of the front body and the fourth protrusion of the rear body may be integrated by ultrasonic fusion.

A distance between a distal end of the first protrusion and the first surface may be longer than a distance between a distal end of the second protrusion and the first surface, the rib may be extended from the first surface of front body, the rib may include a slant surface so slanted as to allow a distance at the first protrusion between a distal end of the rib and the first surface is formed to be longer than a distance at the second protrusion between a distal end of the rib and the first surface.

The substrate may include a third surface facing the front body, and a distal surface of the first protrusion may be fixed to the third surface of the substrate by an adhesive.

Size of an outer circumference at the first protrusion may be smaller than size of an outer circumference of the third surface at the substrate.

The rear body may include a groove disposed at an outer circumference of the third protrusion and extended to a distal end of the third protrusion.

The lens, the barrel and the front body may be integrally formed.

Each of the first protrusion and the second protrusion may be extended from the first surface so as to allow a cross-section to form a single closed curve shape.

A camera module according to an exemplary embodiment may comprise: a front body; a barrel disposed on the front body; a front body assembly including a lens disposed on the barrel; a rear body coupled with the front body assembly; a substrate disposed at an inner space between the front body assembly and the rear body; and an image sensor disposed on the substrate, wherein the front body assembly may include a first surface facing the rear body, a first protrusion and a second protrusion protruded from the first surface and each spaced apart, and a rib connecting the first protrusion and the second protrusion, and wherein the first protrusion may be disposed at an inside of the second protrusion to allow being nearer to an optical axis than the second protrusion, and the first protrusion may be coupled with the substrate, and the second protrusion may be coupled with the rear body, and the rib may be formed with a plural number, each spaced apart, and a plurality of discrete spaces may be formed among the plurality of ribs.

A camera module according to an exemplary embodiment may comprise: a front body; a lens disposed on the front body; a rear body coupled to the front body; a first substrate disposed at an inner space between the front body and the rear body and including an image sensor formed at an area corresponding to that of the lens; a second substrate spaced apart at the inner space from the first substrate, and electrically connected to the first substrate; a connector coupled to the second substrate by passing through the rear body; and a shield member coupled by the first substrate and the second substrate, wherein the shield member may include a body part coupled to the first substrate, an extension part extended from the body part, and a hole disposed on the extension part, and wherein at least a part of the second substrate may include a protrusion disposed on the hole, the protrusion may include four surfaces disposed on the hole to face the extension part, and at least one surface on the four surfaces of the protrusion may be spaced apart from the extension part.

At least two surfaces of the four surfaces of the protrusion may be spaced apart from the extension part.

The protrusion may include a first protrusion disposed on a first surface of the second substrate, and a second protrusion disposed on a second surface of the second substrate disposed opposite to the first surface, and the second substrate may further include a first groove disposed on both sides of the first protrusion at an outer circumference of the second substrate, and a second groove disposed on both sides of the second protrusion at an outer circumference of the second substrate, and the extension part may include a first extension part disposed on the first groove and a second extension part disposed on the second groove, and at least one of an inner surface of the first extension part and an inner surface of the second extension part may be spaced apart from the second substrate.

The camera module may further comprise a cover fixed to an inner surface of rear body, wherein the cover may include a bottom plate including a hole passed through by the connector, and a side plate extended from the bottom plate, and the bottom plate of the cover may include a pressing unit elastically support the connector.

The first substrate may include a third surface facing the second substrate, and the shield member may include a protrusion coupled to the third surface of the first substrate.

The shield member may further include a first slant part outwardly slantly extended from the extension part, and a second slant part inwardly slantly extended from the first slant part.

The body part may be formed with four (4) pieces, each spaced apart, and may further include four (4) connection parts connecting the four body parts.

The second substrate may include three protrusions, and the shield member may include three extension parts respectively coupled to the three protrusions.

The extension part may be extended from four surfaces of the shield member, each of the three body parts out of the four body parts of the shield member may be disposed with an extension part, and the remaining body part may be disposed with a cut-out part, and the cut-out part may be more recessed than the fourth surface, and a groove may be disposed between the cut-out part and the fourth surface.

A camera module according to an exemplary embodiment may comprise: a front body assembly including a lens; a rear body coupled to the front body assembly; a first substrate including an image sensor disposed at an inner space between the front body assembly and the rear body assembly and spaced apart from the first substrate in the inner space; a second substrate disposed in the inner space by being spaced apart from the first substrate and electrically connected to the first substrate; a connector fixed to the second substrate by passing through the rear body; and a shield member coupled to the first substrate and the second substrate, wherein the shield member may include a body part coupled to the first substrate, and a coupling part extended from the body part and coupled to the second substrate, the second substrate may further include a first groove disposed on a first surface of the second substrate, and a second groove disposed on a second surface of the second substrate, the coupling part may include a third surface facing the second substrate, and a first coupling part disposed on the first groove, a fourth surface facing the second substrate and a second coupling part disposed on the second groove, and at least one of the third surface of the first coupling part and the fourth surface of the second coupling part may be spaced apart from the second substrate.

A camera module according to an exemplary embodiment may comprise: a front body; a lens disposed on the front body; a rear body coupled to the front body; a first substrate disposed at an inner space between the front body and the rear body; an image sensor disposed on the first substrate; a second substrate disposed at the inner space by being spaced apart from the first substrate, and electrically connected to the first substrate; a connector coupled to the second substrate; and a cover fixed to an inside of the rear body, wherein the cover may include a bottom plate including a hole disposed with the connector, a side plate extended from the bottom plate, and a pressing unit disposed on the bottom plate and elastically pressing the connector, and wherein the connector may include a first surface facing an inner surface of the bottom plate of the cover and a second surface extended from the first surface and disposed on the hole, and the pressing unit may include a first pressing unit pressing a first surface of connector and a second pressing unit pressing a second surface of connector.

The first pressing unit and the second pressing unit may be integrally formed with the bottom plate.

The pressing unit may include a first extension part inwardly slantly extended from the bottom plate, and a first contact part extended from the first extension part to contact a first surface of the connector, and a second extension part slantly extended toward the hole from the first contact part.

The pressing unit may further include a second contact part extended from the second extension part to contact a second surface of connector, and a third extension part slantly outwardly extended from the second contact part.

A distal end of the side plate may be overlapped with the first substrate to a direction perpendicular to an optical axis of the lens.

The pressing unit may include four (4) pressing pieces, each spaced apart from the other, and the said four pressing pieces may be equidistantly disposed on a circumference of second surface of connector.

The pressing unit may include a plurality of pressing pieces, each space apart from the other, and a part of the plurality of pressing pieces may be formed as a first pressing unit, and the remaining part of the plurality of pressing pieces may be formed as a second pressing part.

The camera module may further include a shield member coupled to the first substrate and the second substrate, and the shield member may include a body part coupled to the first substrate, a coupling part extended from the body part and coupled to the second substrate, and the coupling part may be contacted to the side plate of cover.

An external surface of cover and the connector may be grounded.

A camera module according to an exemplary embodiment may comprise: a front body assembly including a lens; a rear body coupled to the front body assembly; a first substrate disposed at an inner space between the front body assembly and the rear body; a second substrate so disposed at the inner space as to be spaced apart from the first substrate and electrically connected to the first substrate; a connector fixed to the rear body and the second substrate; and a cover fixed to inside of the rear body, wherein the cover may include a bottom plate including a hole disposed with the connector, a side plate extended from the bottom plate, and a pressing unit disposed on the bottom plate and elastically supporting the connector, wherein the pressing unit may include a first pressing part pressing the connector to a first direction, and a second pressing part pressing the connector to a second direction different from the first direction.

Advantageous Effects

The exemplary embodiment has an advantageous effect in that a rear body and a bracket of a camera module can be easily assembled to be conducive to improvement of manufacturing yield.

The exemplary embodiment has an advantageous effect in that the phenomenon of foreign objects and moisture outside of camera module being introduced into the camera module can be prevented.

The exemplary embodiment has an advantageous effect in that a support structure comprising a plurality of substrates is provided to thereby contribute to miniaturization of camera module.

The exemplary embodiment has an advantageous effect in that a reduced manufacturing cost can be expected by performing shield of electromagnetic wave and fixture of connector through a cover of relatively simple structure.

BEST MODE

Figure 1:
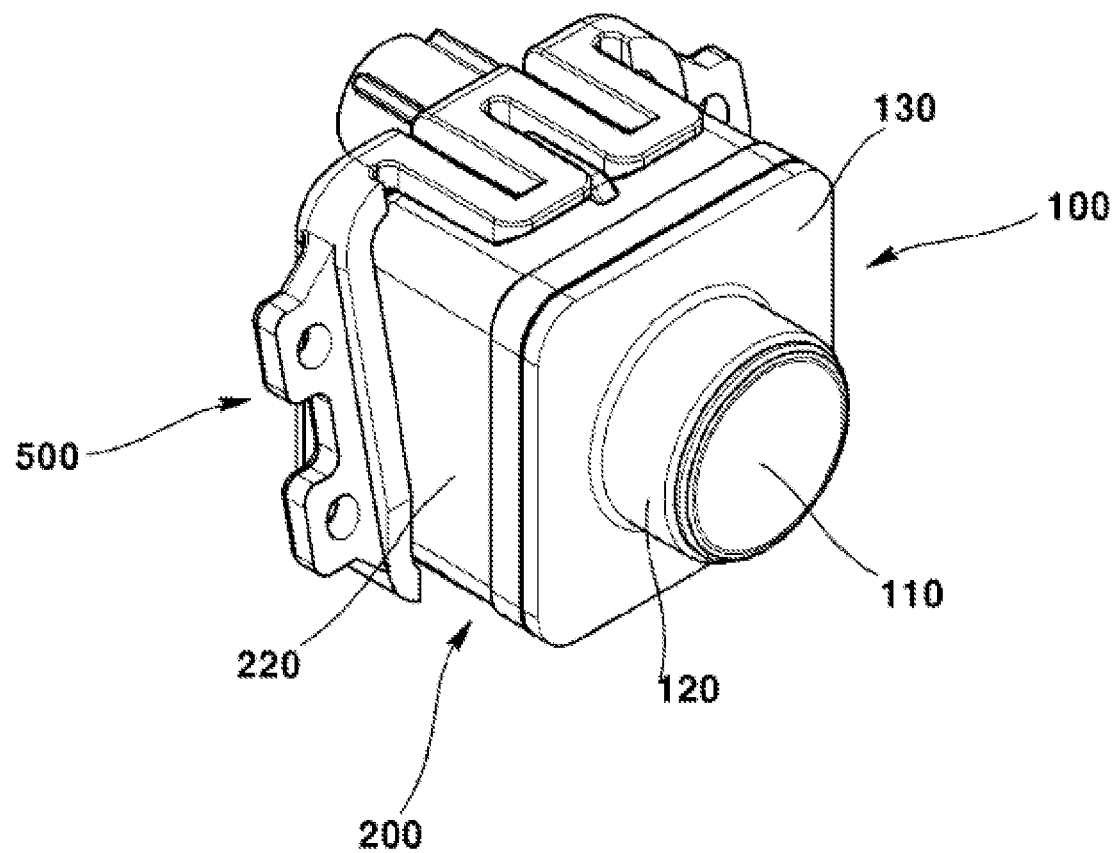
FIG. 1 is a perspective view of a camera module according to an exemplary embodiment of the present invention.

Some exemplary embodiments of present invention will be described in detail with reference to the accompanying drawings for convenience sake. All the exemplary embodiments hereinafter explained should be understood to be merely exemplary in order to help understand the present invention, and the embodiments may, however, be embodied in many different forms and should not be construed as limited to the embodiments set forth herein.

In describing elements in the exemplary embodiments of the present invention, the terms, first, second, A, B (a), (b), etc., may be used. These terms may be used only to distinguish one element from another element, and the nature, order or sequence is not restricted by these terms.

When an element is referred to as being "accessed to", "coupled to," or "connected to," another element, it should be appreciated that the element may be directly accessed, connected or coupled to the other element, or intervening elements may be present therebetween.

Hereinafter, any one of "inner protrusion (132)", "outer protrusion (133)", "external wall protrusion (221)" and "fusion protrusion (222)" may be called a "first protrusion", a remaining one may be called a "second protrusion", another remaining one may be called a "third protrusion" and the remaining one may be called a "fourth protrusion".

Hereinafter, any one of a "rib (134)" and a "rib (225)" may be called a "first rib" and the remaining one may be called a "second rib".

Hereinafter, any one of a "front substrate (310)" and a "rear substrate (320)" may be called a "first substrate" and the remaining one may be called a "second substrate".

Hereinafter, any one of a "guide groove (345*a*)" and a "discrete groove (345*b*)" may be called a "first groove" and the remaining one may be called a "second groove".

Hereinafter, configuration of a camera module according to an exemplary embodiment will be described with reference to the accompanying drawings.

Figure 2:
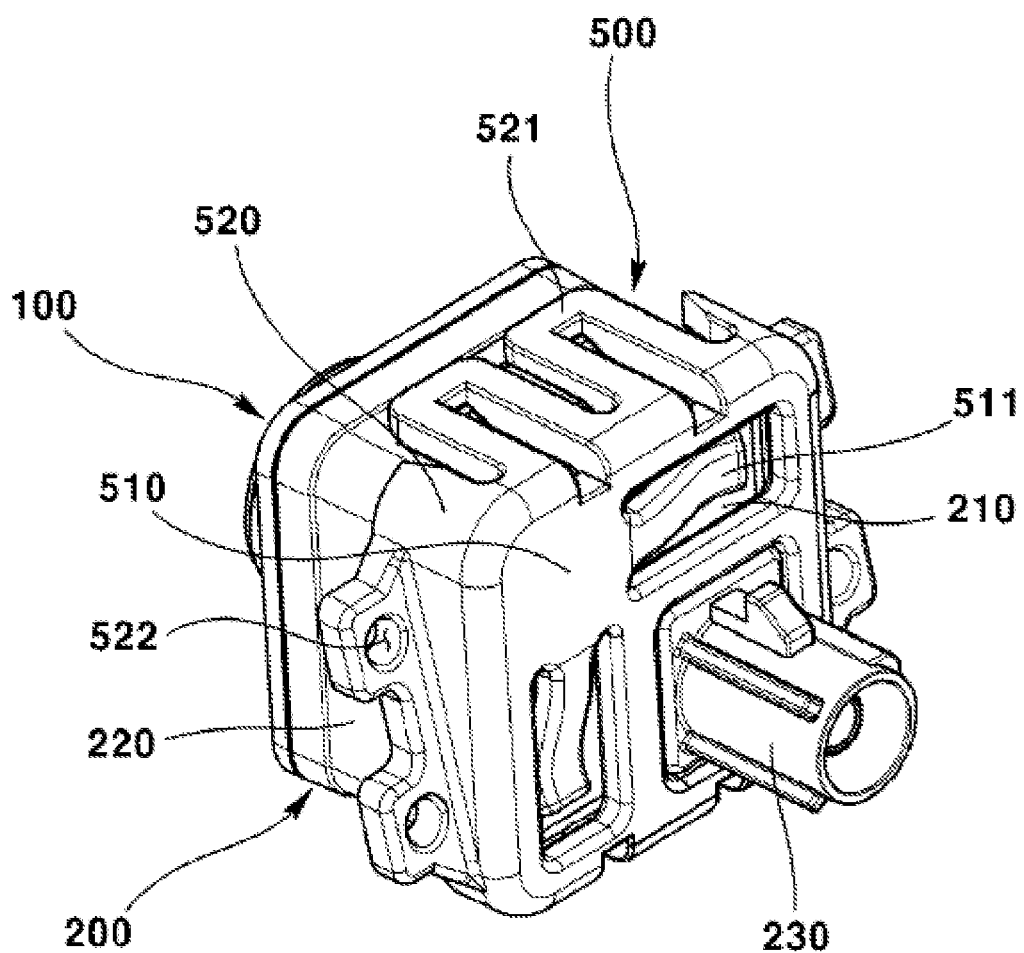
FIG. 2 is a perspective view of a camera module viewed from a different direction of FIG. 1 according to an exemplary embodiment of the present invention.
Figure 3:
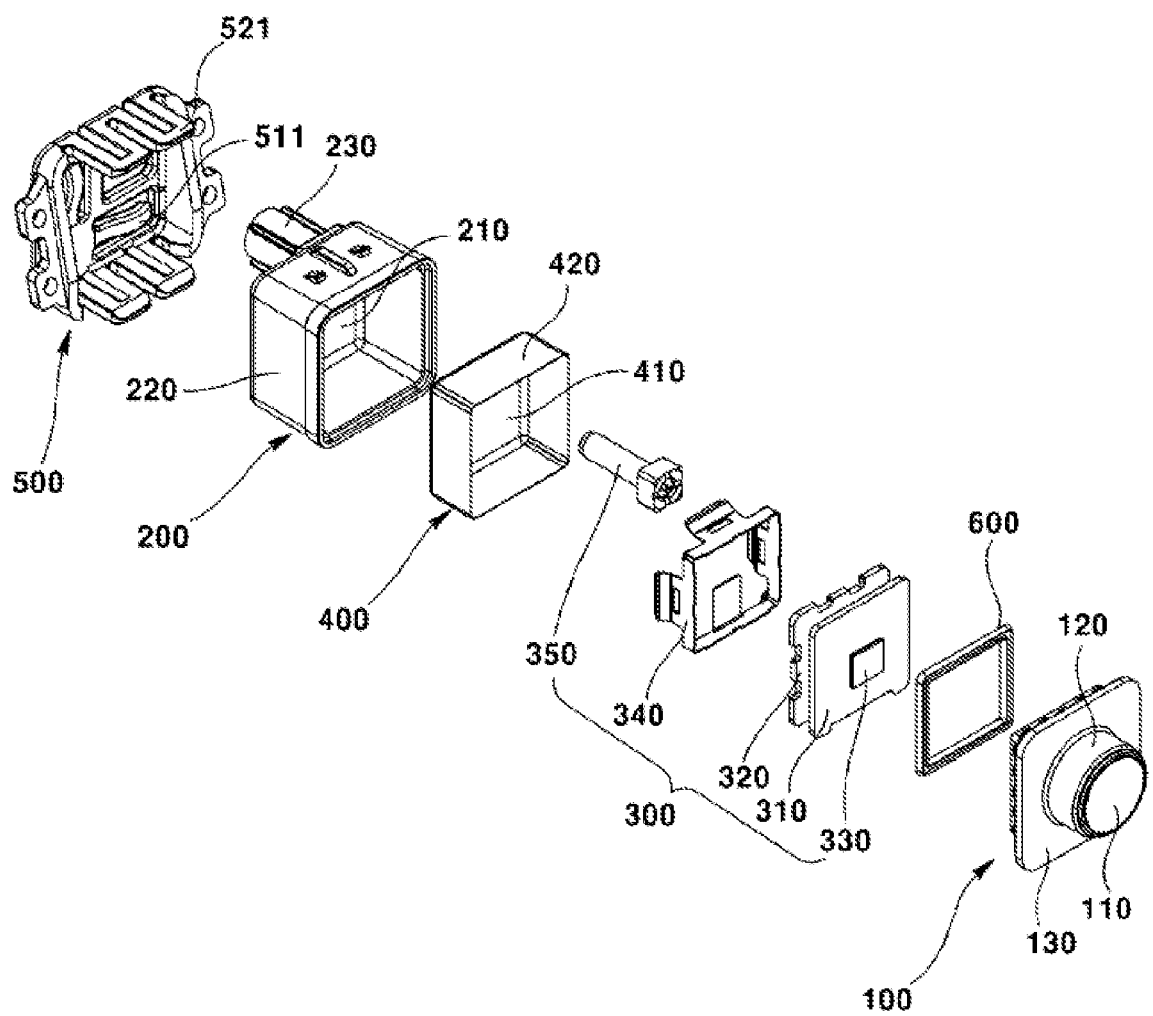
FIG. 3 is an exploded perspective view of a camera module according to an exemplary embodiment of the present invention.
Figure 4:
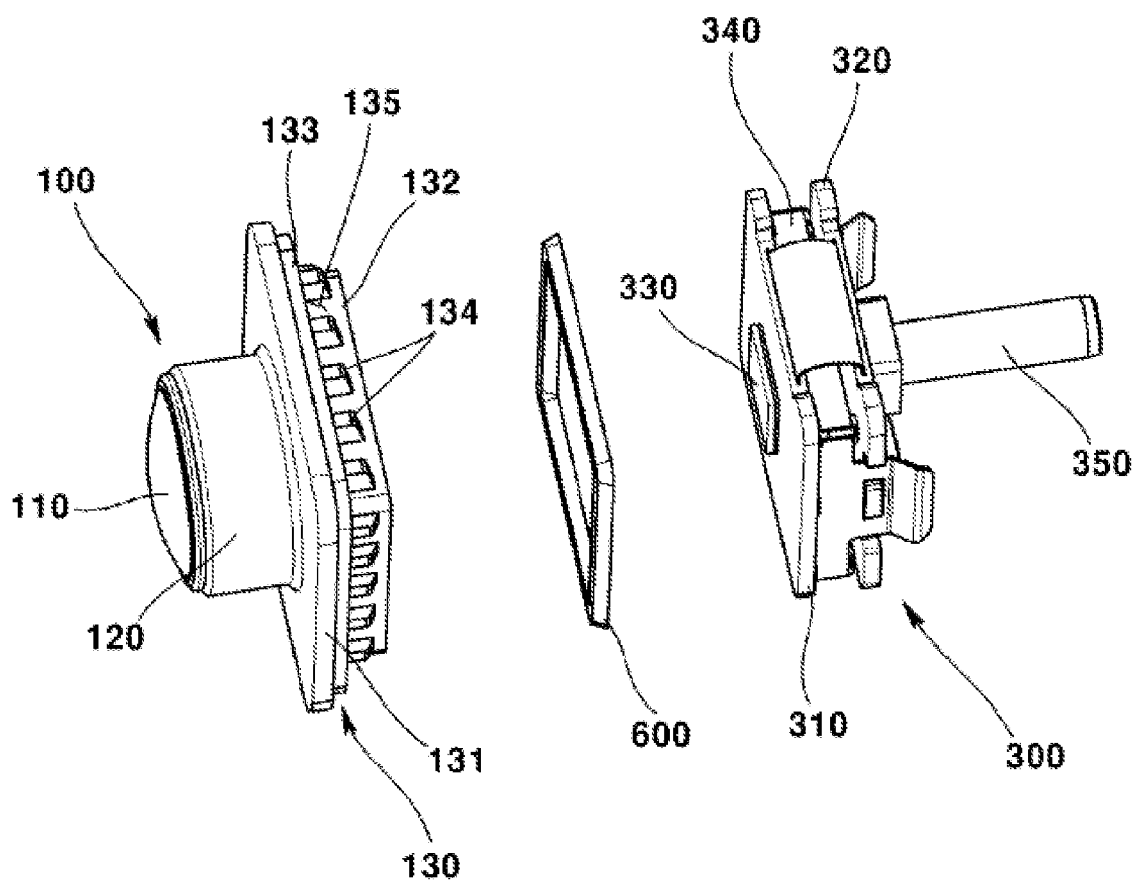
FIG. 4 is an exploded perspective view of some elements of a camera module according to an exemplary embodiment of the present invention.
Figure 5:
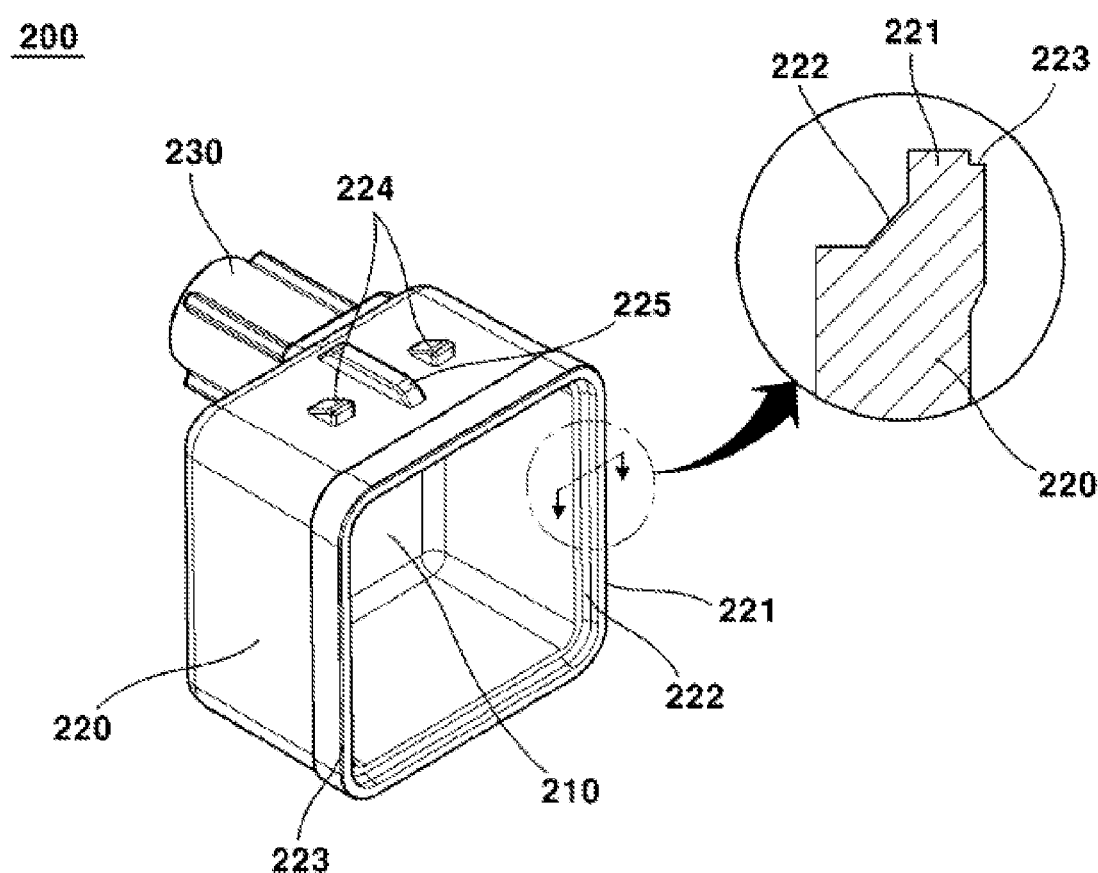
FIG. 5 is a perspective view and a partially enlarged view of a rear body of a camera module according to an exemplary embodiment of the present invention.
Figure 6:
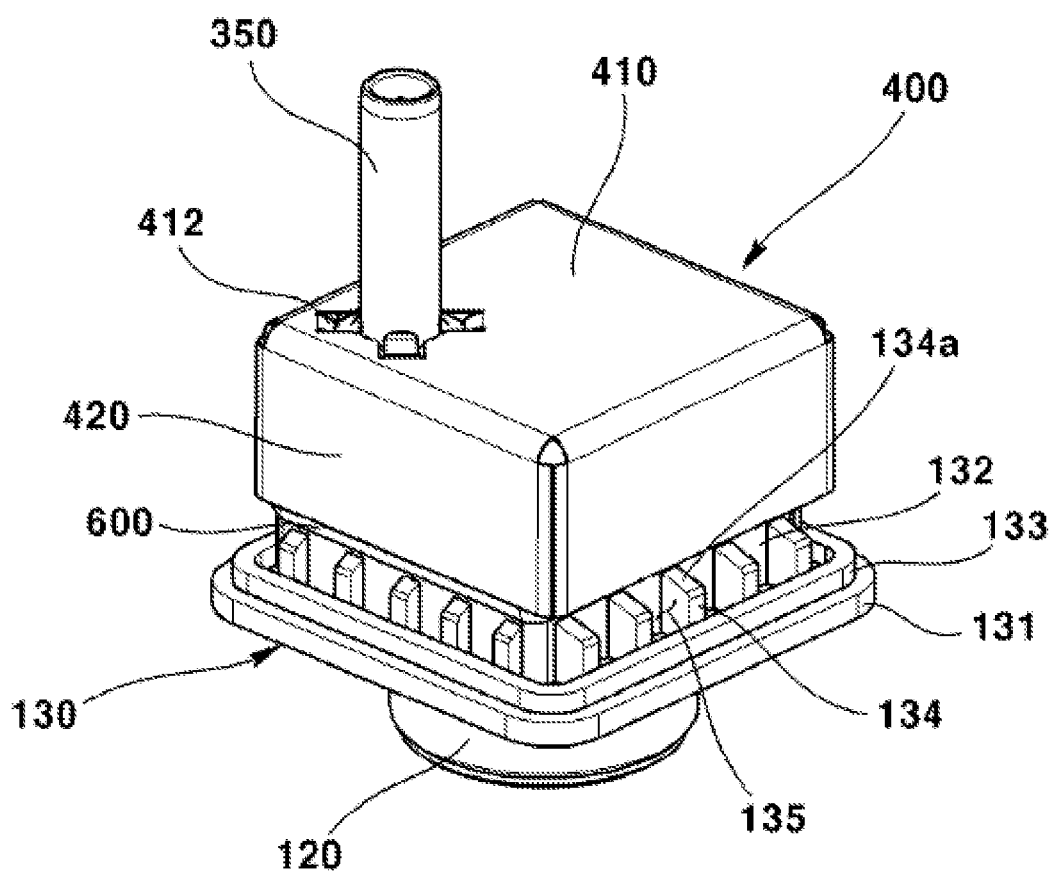
FIG. 6 is a perspective view of some elements of a camera module according to an exemplary embodiment of the present invention.
Figure 7:
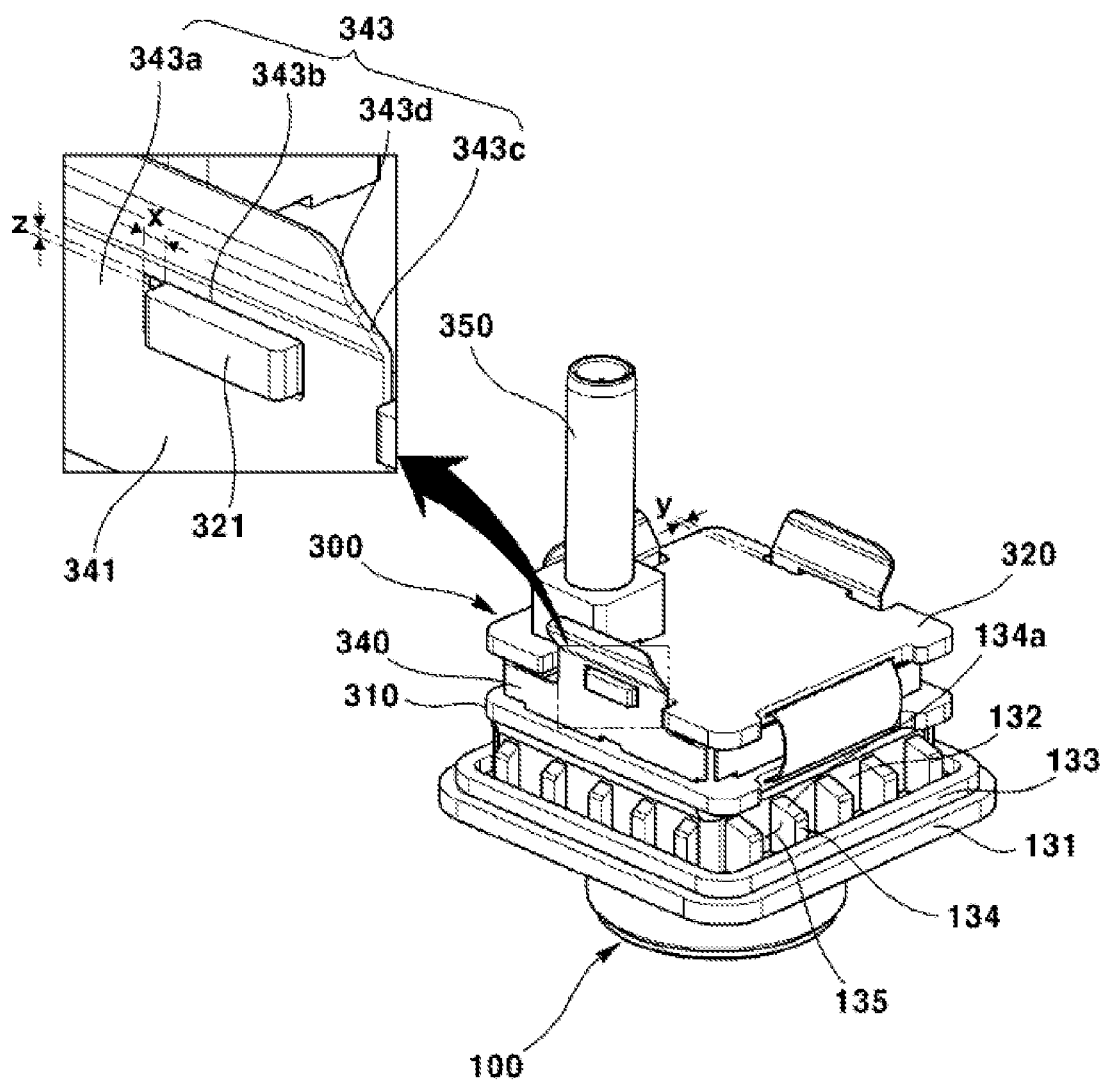
FIG. 7 is a perspective view and a partially enlarged view of some elements of a camera module according to an exemplary embodiment of the present invention.
Figure 8:
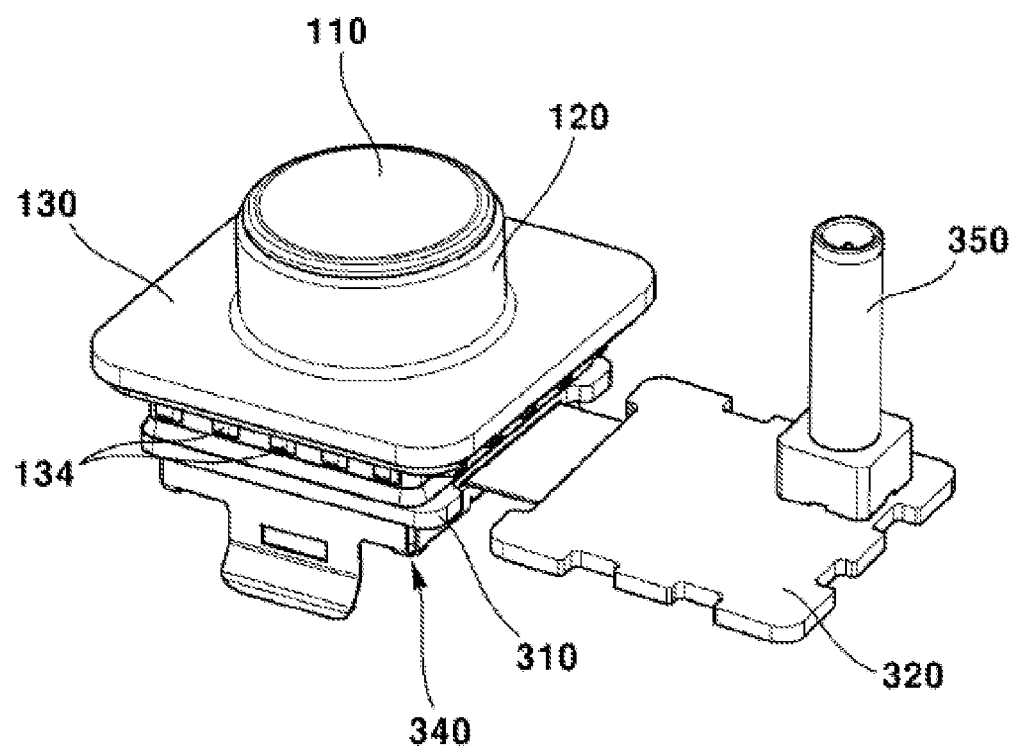
FIG. 8 is a perspective view illustrating a state of a process in which some elements of camera module are assembled according to an exemplary embodiment of the present invention.
Figure 9:
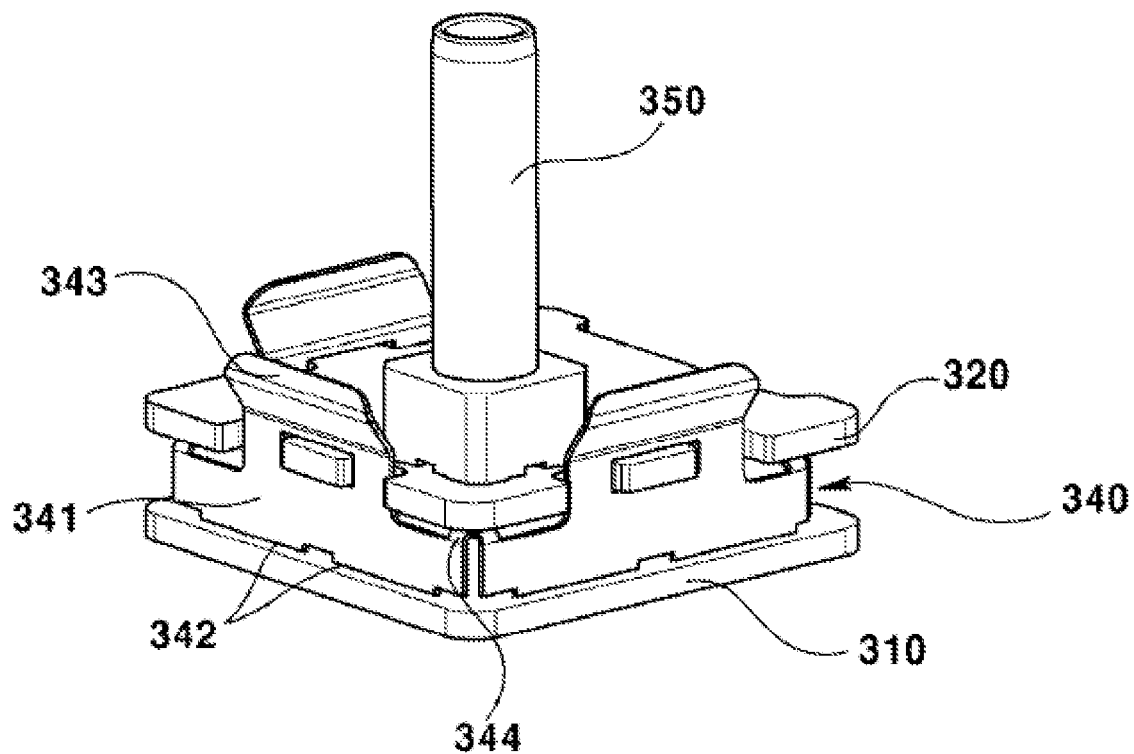
FIGS. 9 and 10 are perspective views of some elements of a camera module according to an exemplary embodiment of the present invention.
Figure 10:
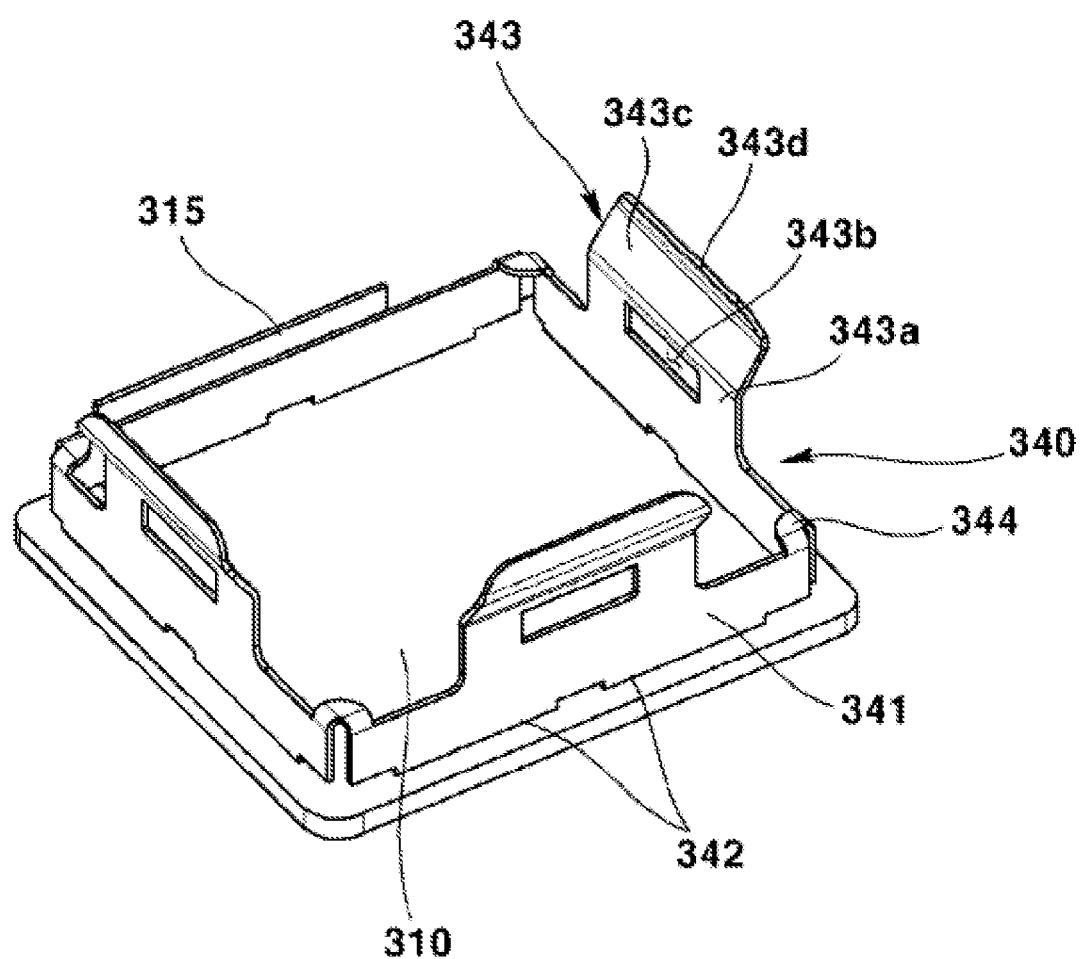
Figure 11:
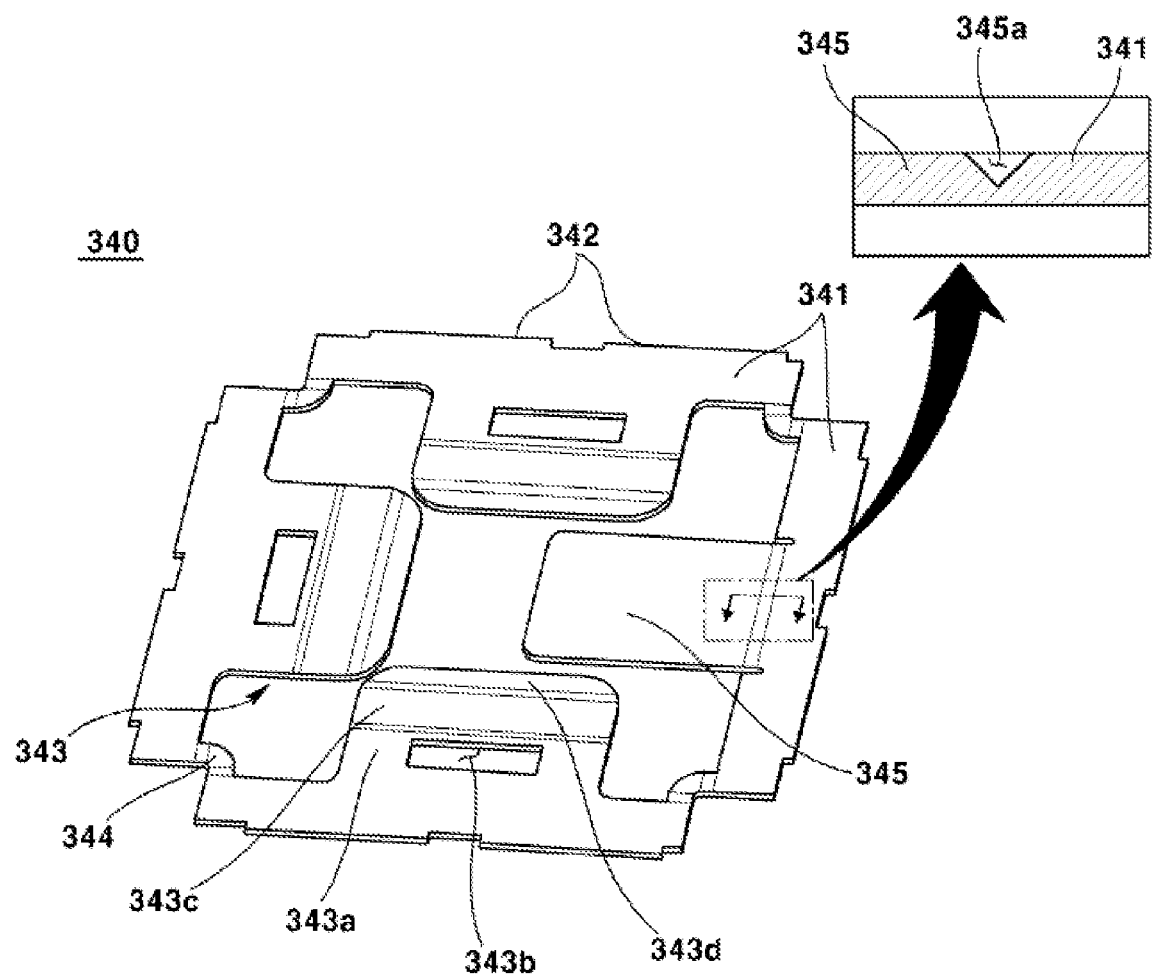
FIG. 11 is a planar view of a shield member of a camera module according to an exemplary embodiment of the present invention.
Figure 12:
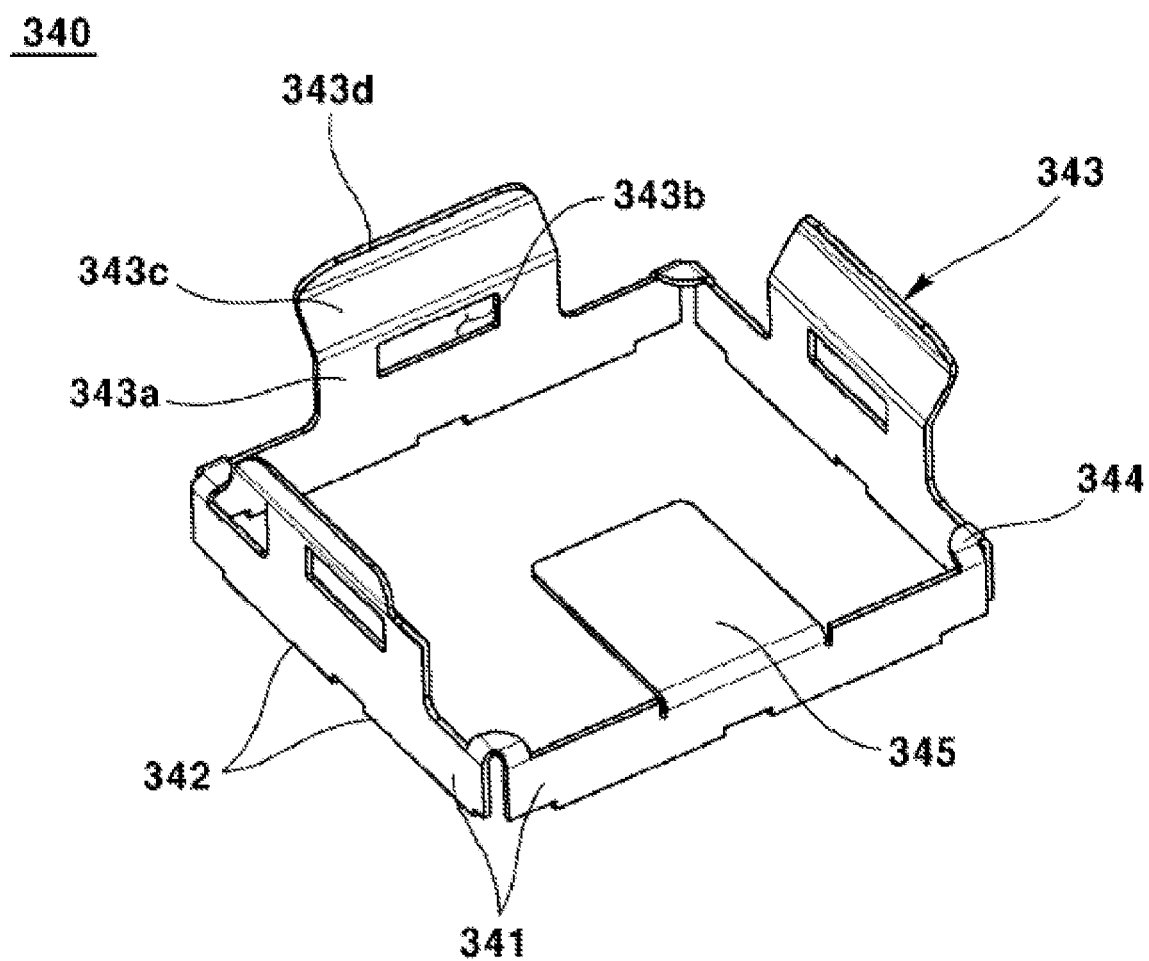
FIG. 12 is a perspective view illustrating a state of a process in which a shield member of a camera module is assembled according to an exemplary embodiment of the present invention.
Figure 13:
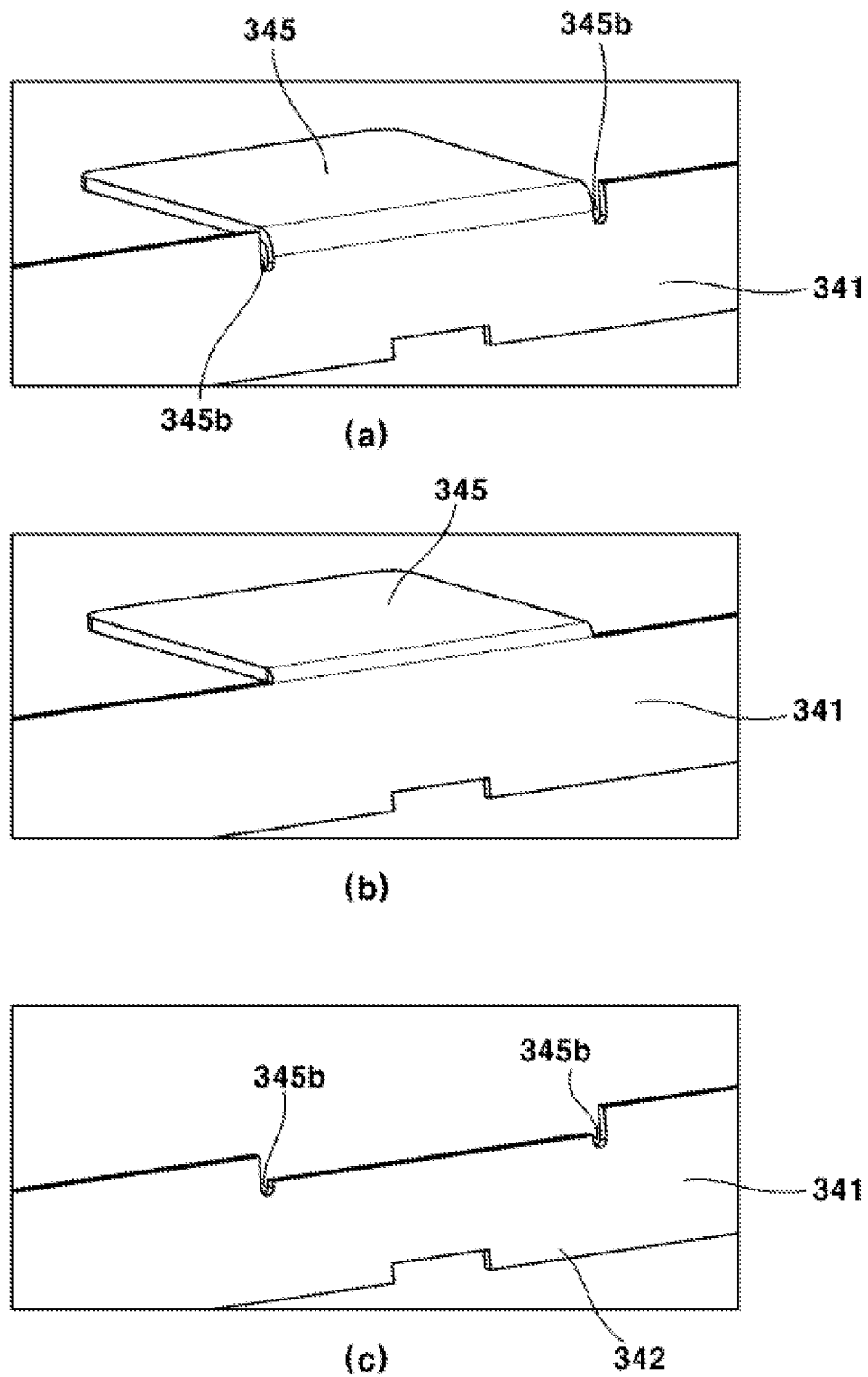
FIG. 13 is a perspective view of some elements of a shield member in a camera module, where FIG. 13(*a*) illustrates a configuration related to a bar of a shield member according to an exemplary embodiment (first exemplary embodiment), FIG. 13(*b*) illustrates a configuration related to a bar of a shield member according to a modification (second exemplary embodiment), and FIG. 13 (*c*) illustrates a state where a bar of a shield member is removed according to an exemplary embodiment (first exemplary embodiment).
Figure 14:
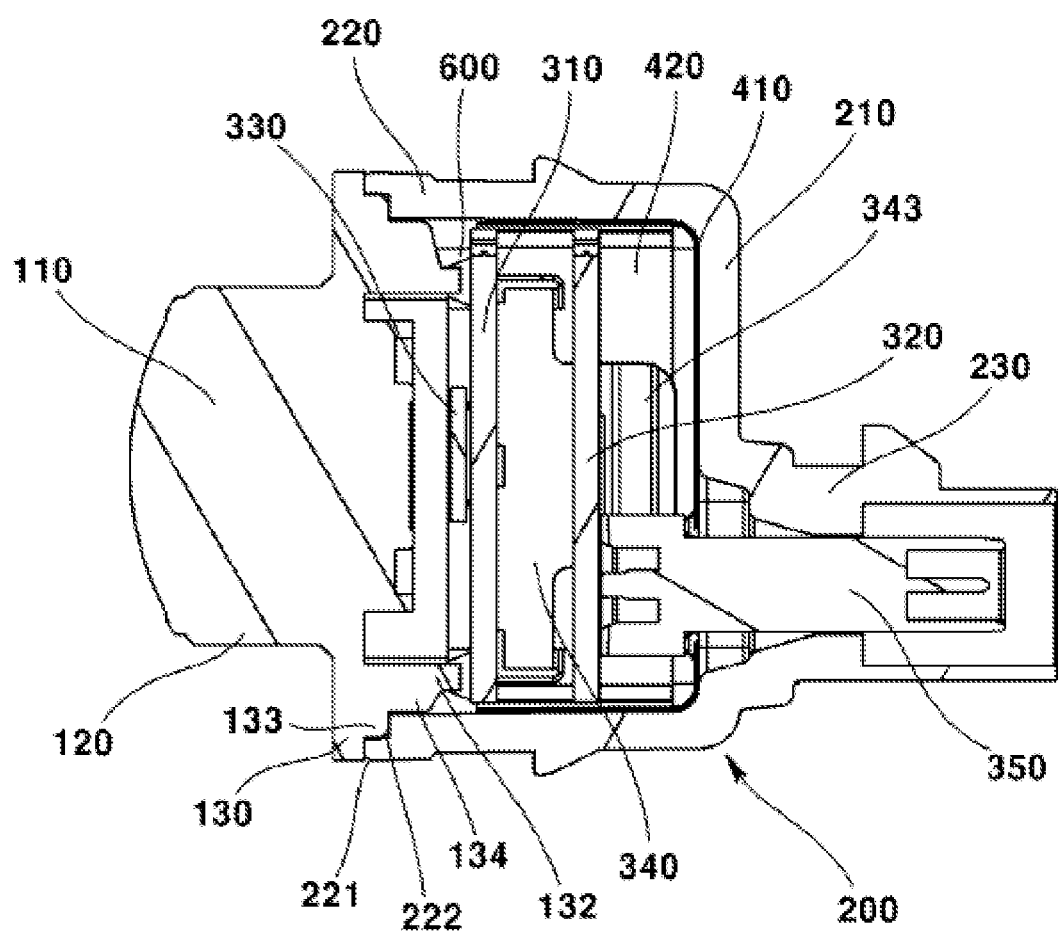
FIG. 14 is a cross-sectional view of a camera module according to an exemplary embodiment of the present invention.
Figure 15:
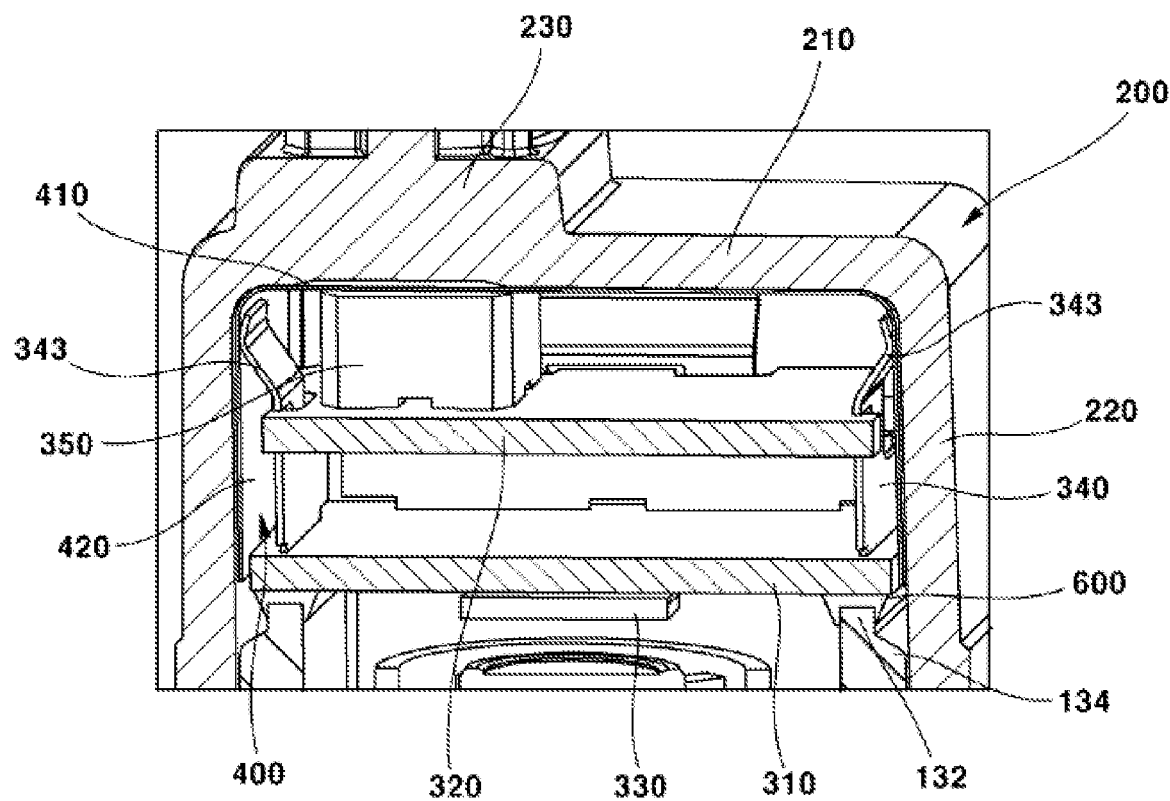
FIGS. 15 and 16 are cross-sectional perspective views of some elements of a camera module according to an exemplary embodiment of the present invention.
Figure 16:
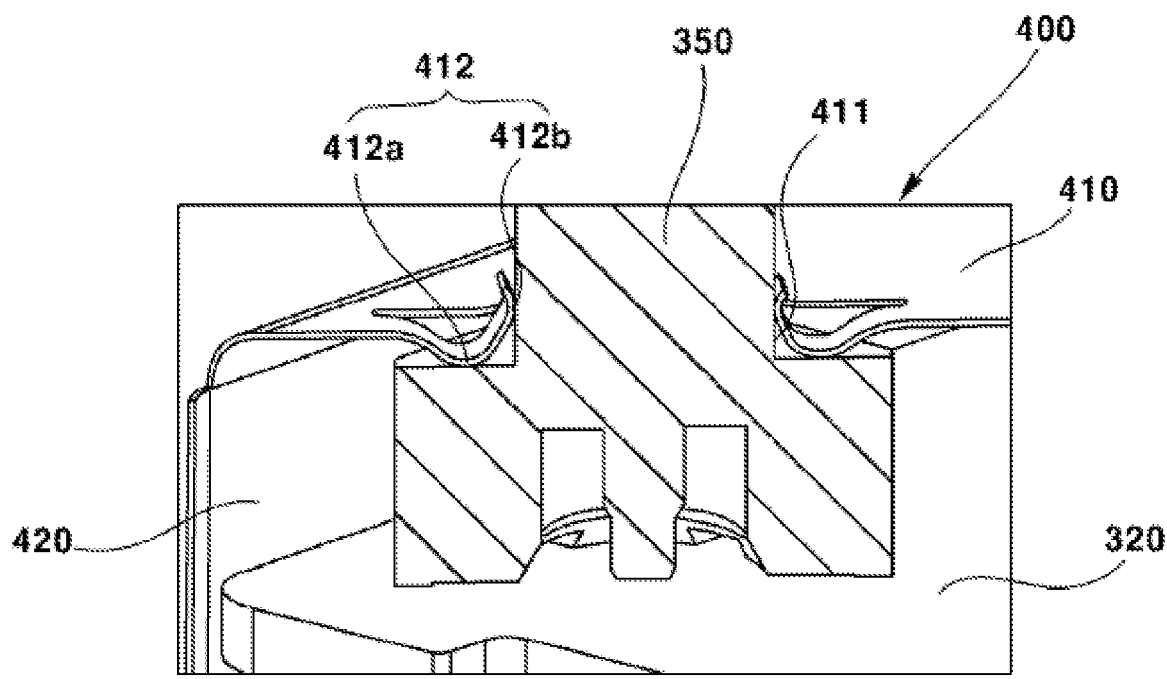
Figure 17:
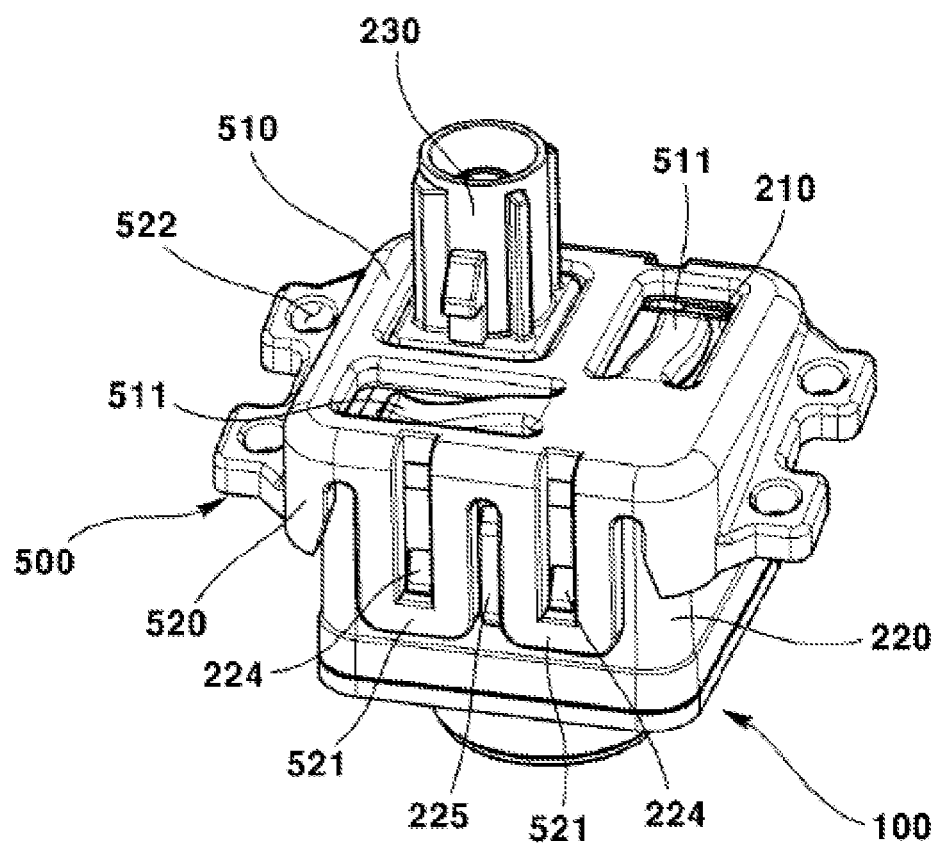
FIG. 17 is a perspective view of a camera module according to an exemplary embodiment of the present invention.
Figure 18:
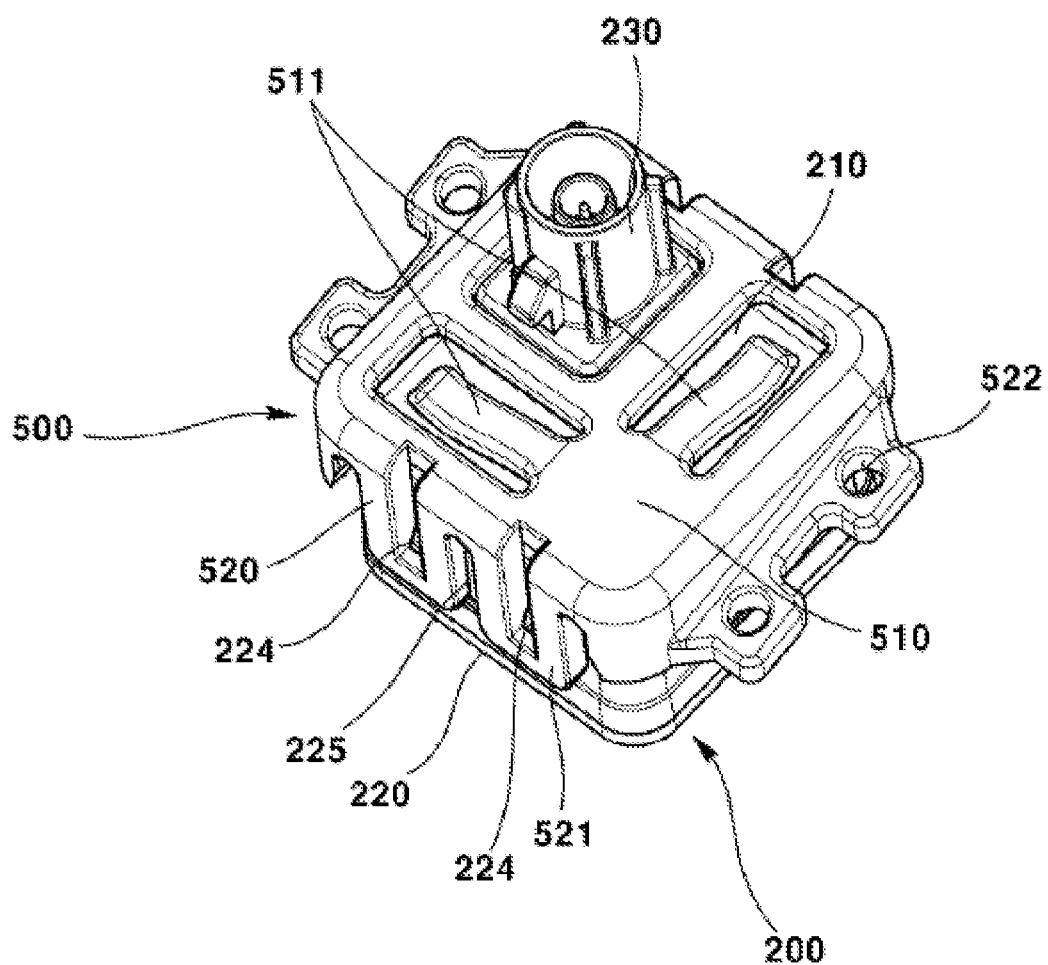
FIG. 18 is a perspective view of some elements of a camera module according to an exemplary embodiment of the present invention.
Figure 19:
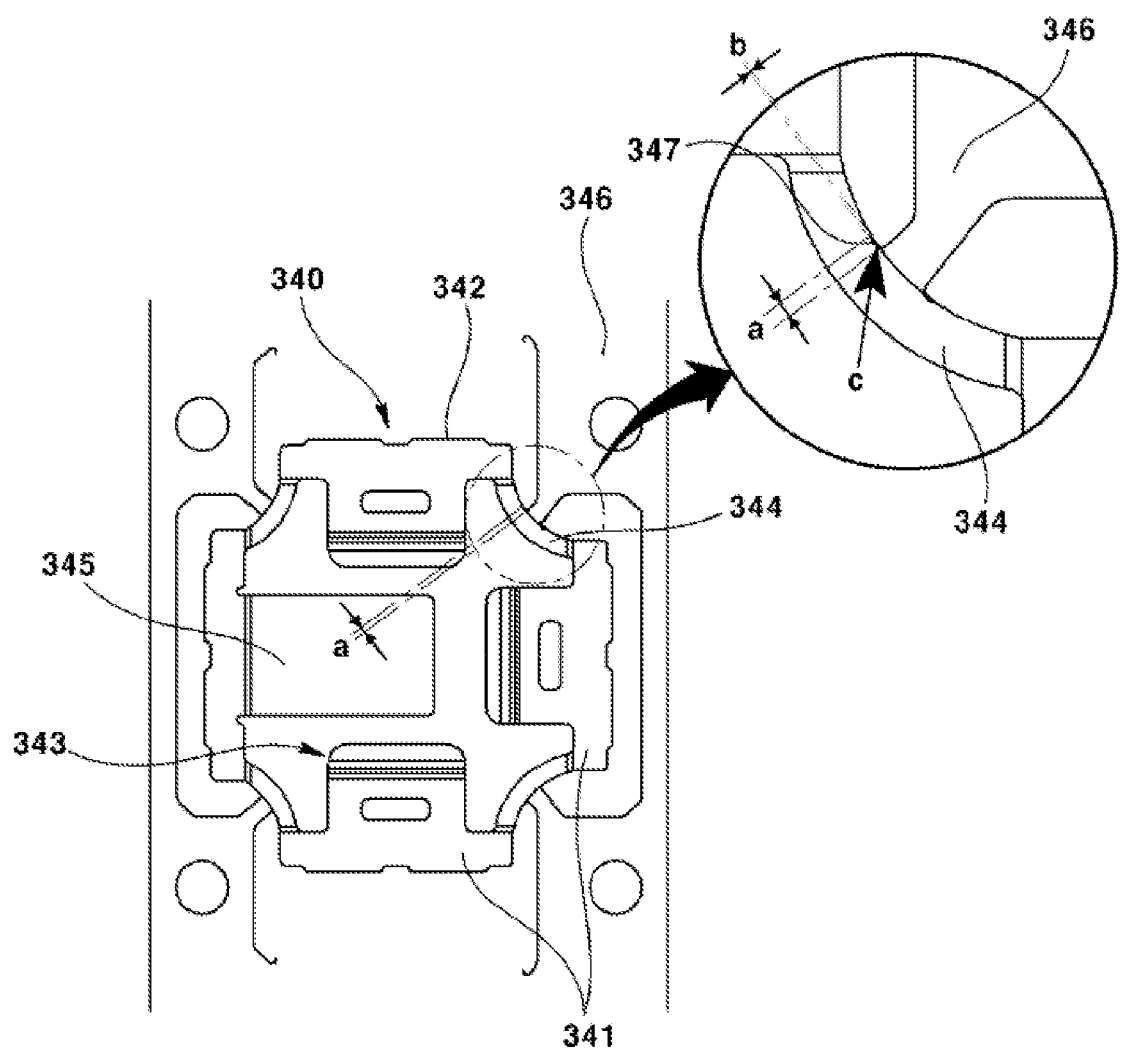
FIG. 19 is a planar view in a manufacturing process of a shield member according to an exemplary embodiment of the present invention.
Figure 20:
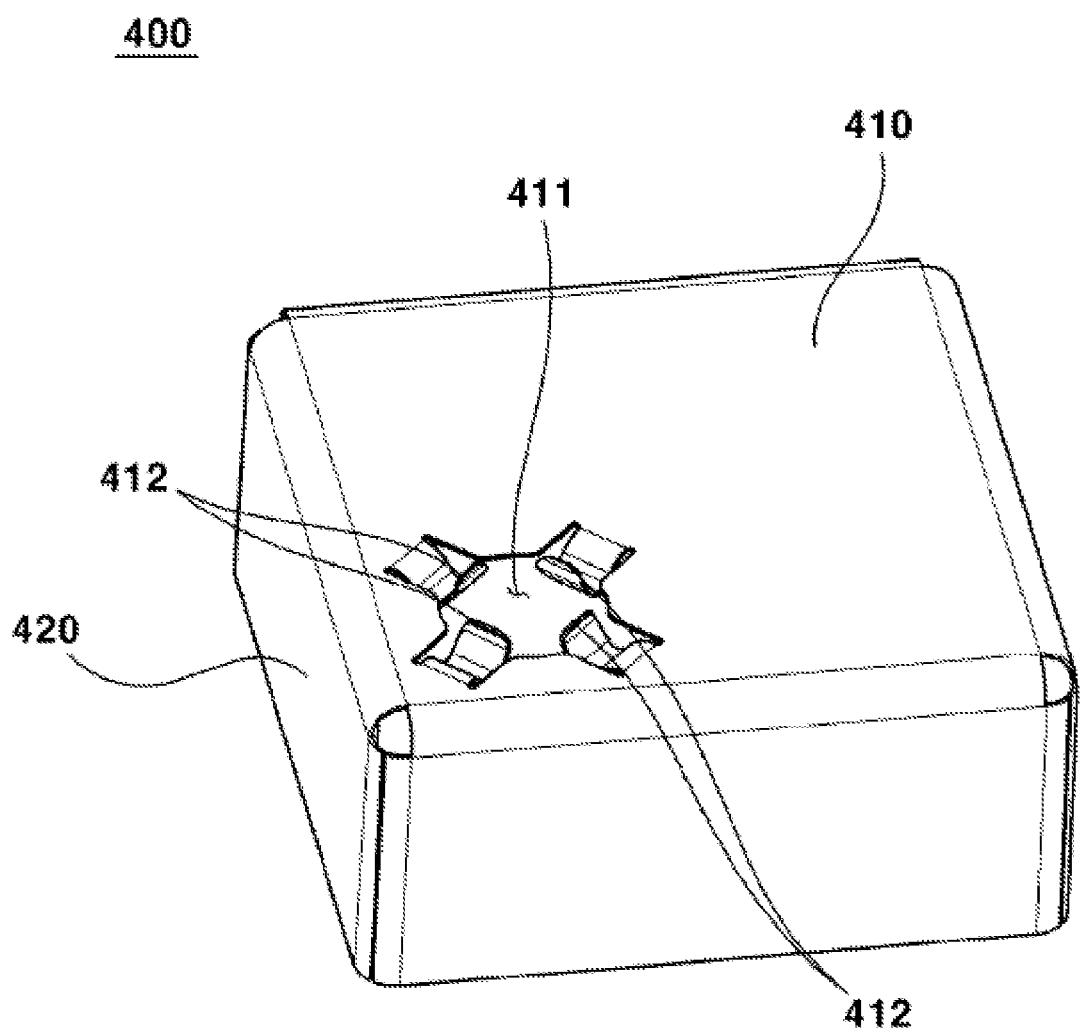
FIG. 20 is a perspective view of a cover according to an exemplary embodiment of the present invention.

FIG. 1 is a perspective view of a camera module according to an exemplary embodiment of the present invention, FIG. 2 is a perspective view of a camera module viewed from a different direction of FIG. 1 according to an exemplary embodiment of the present invention, FIG. 3 is an exploded perspective view of a camera module according to an exemplary embodiment of the present invention, FIG. 4 is an exploded perspective view of some elements of a camera module according to an exemplary embodiment of the present invention, FIG. 5 is a perspective view and a partially enlarged view of a rear body of a camera module according to an exemplary embodiment of the present invention, FIG. 6 is a perspective view of some elements of a camera module according to an exemplary embodiment of the present invention, FIG. 7 is a perspective view and a partially enlarged view of some elements of a camera module according to an exemplary embodiment of the present invention, FIG. 8 is a perspective view illustrating a state of a process in which some elements of camera module are assembled according to an exemplary embodiment of the present invention, FIGS. 9 and 10 are perspective views of some elements of a camera module according to an exemplary embodiment of the present invention, FIG. 11 is a planar view of a shield member of a camera module according to an exemplary embodiment of the present invention, FIG. 12 is a perspective view illustrating a state of a process in which a shield member of a camera module is assembled according to an exemplary embodiment of the present invention, FIG. 13 is a perspective view of some elements of a shield member in a camera module, where FIG. 13(*a*) illustrates a configuration related to a bar of a shield member according to an exemplary embodiment (first exemplary embodiment), FIG. 13(*b*) illustrates a configuration related to a bar of a shield member according to a modification (second exemplary embodiment), and FIG. 13 (*c*) illustrates a state where a bar of a shield member is removed according to an exemplary embodiment (first exemplary embodiment), FIG. 14 is a cross-sectional view of a camera module according to an exemplary embodiment of the present invention, FIGS. 15 and 16 are cross-sectional perspective views of some elements of a camera module according to an exemplary embodiment of the present invention, FIG. 17 is a perspective view of a camera module according to an exemplary embodiment of the present invention, FIG. 18 is a perspective view of some elements of a camera module according to an exemplary embodiment of the present invention, FIG. 19 is a planar view in a manufacturing process of a shield member according to an exemplary embodiment of the present invention, and FIG. 20 is a perspective view of a cover according to an exemplary embodiment of the present invention.

A camera module may be coupled to a vehicle. The camera module may be used for any one or more of a front camera of a vehicle, a side camera, a rear camera and a black box camera. The camera module may capture a subject and output the captured subject in an image to a display part (not shown).

The camera module may include a front body assembly (100). The front body assembly (100) may include a lens (110), a barrel (120) and a front body (130). The lens (110), the barrel (120) and the front body (130) may be integrally formed in the present exemplary embodiment. Through this configuration, the lens (110), the barrel (120) and the front body (130) may omit an additional sealing member supposedly disposed among a lens (110), a barrel (120) and a front body (130) essentially required over a comparative example where the lens (110), the barrel (120) and the front body (130) are not integrally formed. Alternatively, more than two elements of the lens (110), the barrel (120) and the front body (130) may be integrally formed.

The front body assembly (100) may include a lens (110). The front body assembly (100) may include a plurality of lenses (110). The lens (110) may be disposed on the barrel (120). The lens (110) may be accommodated into the barrel (120). The lens (110) may be formed in a plural number. The lens (110) may be aligned with an image sensor (330). That is, an optical axis of lens (110) and an optical axis of image sensor (330) may be matchingly aligned. The front body assembly (100) may include an IR filter (Infrared Ray filter) disposed on a rear side of the lens (110).

The front body assembly (100) may include a barrel (120). The barrel (120) may be disposed on the front body assembly (130). The barrel (120) may accommodate the lens (110) therein. An inner circumferential surface of the barrel (120) may be formed with a shape and a size corresponding to those of an outer circumferential surface of the plurality of lenses (110).

The front body assembly (100) may include a front body (130). The front body (130) may be coupled by the barrel (120). The front body (130) may be coupled with a rear body (200). The front body (130) may be coupled with a front substrate (310). However, in light of the fact that the front body (130) and the barrel (120) are integrally formed in the present exemplary embodiment, it may be explained that the front substrate (310) is coupled with the barrel (120).

The front body (130) may include a body part (131). The body part (131) may be outwardly extended from an outer circumferential surface of barrel (120). The outer circumferential surface of body part (131) may include a squared four-angled shape. However, corners on the outer circumferential surface of the body part (131) may be roundly formed. The body part (131) may include a rear surface (hereinafter referred to as "first surface") facing the front substrate (310).

The front body (130) may include a first surface (rear surface) facing the rear body (200), an inner protrusion protruded from the first surface and spaced apart from the first surface (132, hereinafter referred to as first protrusion") and an outer protrusion (133, hereinafter referred to as "second protrusion").

The front body (130) may include an inner protrusion (132). The inner protrusion (132) may be protruded from a first surface of the body part (131) of front body (130). The inner protrusion (132) may be disposed inside of the outer protrusion (133). The inner protrusion (132) may be coupled with the front substrate (310). A distance between a distal end of the inner protrusion (132) and a first surface of body part (131) may be longer than a distance between a distal end of outer protrusion (133) and a first surface of the body part (131). That is, the inner protrusion (132) may be more protruded than the outer protrusion (133). A distal surface of the inner protrusion (132) may be fixed to a third surface (front surface)) of front substrate (310) by an adhesive. The size of a distal surface of inner protrusion (132) may be smaller than that of an outer circumference of the third surface (front surface) of the front substrate (310). In light of the fact that the adhesive (600) is disposed at an inner side from an outer circumference of front substrate by being spaced apart in the present exemplary embodiment, the phenomenon of adhesive (600) being discharged to outside of the front substrate (310) can be prevented. The inner protrusion (132) may be extended from the first surface of the body part (131) to allow having a single closed curved shape at a cross-section thereof. The outer circumference of inner protrusion (132) may include a four-angled square shape. However, corners of the outer circumference in the inner protrusion (132) may be roundly formed.

The front body (130) may include an outer protrusion (133). The outer protrusion (133) may be protruded from a first surface of the body part (131) of front body (130). The outer protrusion (133) may be disposed outside of the inner protrusion (132). The outer protrusion (133) may be coupled with the rear body (200). The outer protrusion (133) may be spaced apart from an outer circumference of first surface of body part (131) at the front body (130). The outer protrusion (133) may be disposed between the inner protrusion (132) and the outer circumference of body part (131). The outer protrusion (133) may be extended from the first surface of the body part (131) to allowing having a single closed curved shape at a cross-section. The outer circumference of the outer protrusion (133) may include a four-angled square shape. However, corners of the outer circumference of the outer protrusion (133) may be roundly formed.

The front body (130) in the present exemplary embodiment may include a plurality of ribs (134) to connect the inner protrusion (132) and the outer protrusion (133) between the inner protrusion (132) and the outer protrusion (133) and to be mutually spaced apart. A plurality of discrete space (135) may be formed among the plurality of ribs (134). The thus-described discrete structure of the plurality of ribs (134) may be called a "weight-loss structure". The discrete structure of the plurality of ribs (134) in the present exemplary embodiment can minimize the phenomenon of heat generated from an ultrasonic fusion process between the front body (130) and the rear body (200) from being transmitted to an adhesive (600) that fixes the inner protrusion (132) of front body (130) to the front substrate (310).

The front body (130) may include a rib (134). The rib (134) may be extended from a first surface of body part (131) at the front body (130). The rib (134) may connect the inner protrusion (132) with the outer protrusion (133). The rib (134) can reinforce the strength of the inner protrusion (132) and the outer protrusion (133). The rib (134) may be disposed in a plural number, each mutually spaced apart. At this time, a plurality of discrete spaces (135) may be formed among the plurality of ribs (134). The rib (134) may be disposed, five (5) ribs each, on four surfaces of inner protrusion (132). The rib (134) may be spaced apart from corners of the inner protrusion (132).

The rib (134) may include an inclined slant surface (134a). The rib (134) may include a slant surface (134a) so that a distance between a distal end of the rib (134) and a first surface of body part (131) at the inner protrusion (132) side can be longer than a distance between a distal end of rib (134) and a first surface of body part (131) at the outer protrusion (133) side.

The distal surface of rib (1340 in the present exemplary embodiment may be slantly disposed relative to the inner protrusion (132) and the outer protrusion (133). At this time, the slant may be such that the height of the rib (134) is decreased toward an outside. Through this structure, the slant surface (134a) may guide the insertion of front body (130) when the front body (130) is inserted into an inner space of rear body (200). That is, even if the front body (130) is inserted into the rear body (200) by being deviated from a normal position at a predetermined gap, an external wall protrusion (221) of rear body (200) can be brought into contact with the slant surface (134a) of rib (134) to allow the front body (130) to find a normal proper position at the time of insertion. It should be apparent that insertion is made in such a manner that the rear body (200) receives the front body (130), and at this time, the same explanation can be applied thereto.

The front body (130) may include a discrete space (135). The discrete space (135) may be disposed among the plurality of ribs (134). The discrete space may prevent the phenomenon in which heat generated from the outer protrusion (133) reaches the adhesive (600) disposed inside of the inner protrusion (132) through the discrete space (135) at the time of ultrasonic coupling (fusion).

The camera module may include a rear body (200). The rear body (200) may be coupled with the front body (130). The rear body (200) may form a space there inside through the coupling with the front body (130).

The front body (130) and the rear body (200) in the present exemplary embodiment may be coupled by allowing the outer protrusion (133) and a fusion protrusion (222) to be fused. The outer protrusion (133) of front body (130) and the fusion protrusion (222) of rear body (200) may be integrated by the ultrasonic fusion. At this time, the ultrasonic fusion between the rear body (200) and the front body (130) may mean a process in which the rear body (200) and the front body (130) are fused and integrated at a contact area while the front body is pressed and vibrated at the same time while the rear body (200) is fixed. At this time, the fusion protrusion (222) of rear body (200) and an outer protrusion (133) of front body (130) may be integrated by fusion through generation of high temperature. In a modification, the front body (130) may be fixed and the rear body (200) is pressed and simultaneously vibrated at the time of ultrasonic fusion. The ultrasonic fusion in the present exemplary embodiment may be called a "ultrasonic fusion", a "pressure/vibration fusion" and the like.

The rear body (200) may include a bottom part (210) spaced apart from the front body (130), and a side part (220) extended from the bottom part (210) toward the front body (130). The rear body (200) may include a bottom part (210). The bottom part (210) may be spaced apart from the front body (130). The bottom part (210) may be so disposed as to be parallel with the front body (130). The bottom part (210) may take a four-angled plate shape. However, corners of the bottom part (210) may be roundly formed. The bottom part (210) may be disposed with a hole through which the connector (350) can pass.

The rear body (200) may include a side part (220). The side part (220) may be extended from the bottom part (210). The side part (220) may encompass a substrate assembly (300) disposed there inside and a cover (400). The side part (220) may be extended from an outer circumference or an edge of bottom part (210). The side part (220) may be disposed in the number of four (4). The said four pieces of side parts (220) may form a 90° with respective other adjacent side parts. The two side parts (220) out of four side parts (220) may be disposed with a protrusion (224) and a rib (225). A distal end (front end) of the side part (220) may be coupled with the front body (130).

The side part (220) of rear body (200) may include a front surface (hereinafter referred to as "second surface") facing the front body (130), an external wall protrusion (221) protruded from the second surface and disposed at a position corresponding to an area between the outer protrusion (133) and an outer circumference of the first surface of front body (130), and a fusion protrusion (222) slantly connecting an inner surface of external wall protrusion (221) and the second surface.

The side part (220) may include the external wall protrusion (221, hereinafter referred to as "third protrusion"). The external wall protrusion (221) may form an outer circumference of side part (220). The external wall protrusion (221) may be formed by allowing an outer circumference of side part (220) to be extended as it is. A front surface of the external wall protrusion (221) may face a rear surface of front body (130). A front surface of external wall protrusion (221) and a rear surface of body part (131) at the front body (130) may be coupled therebetween.

The side part (220) may include a fusion protrusion (222, hereinafter referred to as "fourth protrusion"). The fusion protrusion (222) may slantly connect a front surface (second surface) of side part (220) and an inner surface of the external wall protrusion (221). The slant surface of fusion protrusion (222) may be formed at a 135° with a front surface of side part (220). The slant surface of fusion protrusion (222) may be formed at 135° with an inner surface of external wall protrusion (221). The fusion protrusion (222) may be protruded from a front surface of side part (220). The fusion protrusion (222) and the outer protrusion (133) of front body (130) may be overlapped to a horizontal direction (optical axis direction). The fusion protrusion (222) and the outer protrusion (133) may be fused and integrated by pressure/vibration. The thus-mentioned integrated coupling in the present exemplary embodiment can omit an additional sealing member required between the front body (130) and the rear body (200).

The side part (220) may include a groove (223). The rear body (200) may include a groove (223) disposed at an outer circumferential surface of external wall protrusion (221) and extended to a distal end of the external wall protrusion (221). It can be ascertained through the groove (223) according to the present exemplary embodiment that fusion has been properly implemented between the front body (130) and the rear body (200).

The rear body (200) may include a lug (224) disposed on an outer lateral surface. The side part (220) may include a lug (224). The lug (224) may be hitched by a hook (521) of bracket (500). The lug (224) may be formed with a slant surface at a surface facing a rear side. Through this configuration, when a pressure is applied to the bracket (500)

relative to the rear body (200), the hook (521) rides on the slant surface to be hitched by the lug (224). The lug (224) may be disposed in a total number of four (4), two lugs each on one side part (220) of the rear body (200), that is, disposed on two side parts (220). Although the present embodiment has explained that the side part (220) is disposed with a lug (224, the lug hereinafter may be interchangeably used/interpreted as "protrusion"), and the bracket (500) is disposed with a hook (521), a modification may explain that a hook may be disposed on the side part (220), and the lug may be disposed on the bracket (500).

The lug (224) in the present exemplary embodiment may include a first lug and a second lug mutually spaced apart on any one surface of the external surface (second surface) of rear body (200). At this time, the hook (521) may include a first hook hitched by the first lug and a second hook hitched by the second lug.

The lug (224) may include a sixth surface (front surface) hitched by the hook (521) and a seventh surface (rear surface, slant surface) connecting the sixth surface and the second surface (external surface) of rear body (200). At this time, the seventh surface of the lug (224) may slantly connect the sixth surface of lug (224) and the second surface of rear body (200). The seventh surface of lug (224) may form an acute angle with the sixth surface of lug (224), and may form an obtuse angle with the second surface of rear body (200). Through this configuration, it may be easy for the hook (521) to ride over the seventh surface of lug (224), but conversely, it may be difficult for the hook (521) to be disengaged from the lug (224).

The rear body (200) may include a rib (225) disposed on an external surface (second surface) between the first hook and the second hook. At this time, a width of the rib (225) may correspond to a discrete distance between the first hook and the second hook. Through this configuration, the rib (225) may guide the assembly while the bracket (500) is inserted into the rear body (200). The rib (225) may be disposed between two hooks (521) of bracket (500). The rib (225) may be disposed between two lugs (224).

The rear body (200) may include a connector extraction part (230). The connector extraction part (230) may include a hole. The hole may allow the connector (350) to pass therethrough. The connector extraction part (230) may accommodate therein at least a part of the connector (350). A diameter of at least a part of inner circumference of the connector extraction part (230) may correspond to a diameter of the connector (350). Through this configuration, the connector extraction part (230) can grasp/fix the connector (350).

The camera module may include a substrate assembly (300). The substrate assembly (300) may be accommodated into the cover (400). The substrate assembly (300) may be disposed at an inner space formed by the rear body (200) and the front body (130). The substrate assembly (300) may be fixed to the front body (130) by an adhesive (600).

The substrate assembly (300) may include a front substrate (310, hereinafter referred to as "first substrate"). The front substrate (310) may be disposed at an inner space formed by the front body (130) and the rear body (200). The front substrate (310) may include a front surface (hereinafter referred to as "third surface") facing the front body (130). The front substrate (310) may be disposed with an image sensor (330). At this time, the front substrate (310) may be called a "sensor substrate". The front substrate (310) may be a PCB (Printed Circuit Board). The front substrate (310) may be a Rigid PCB. The front substrate (310) may be electrically connected to a rear substrate (320). The front substrate (310) may include a third surface (rear surface) facing the rear substrate (320). At this time, a shield member (340) may include a lug (342) coupled with the third surface of front substrate (310).

The substrate assembly (300) may include a connection part (315). The connection part (315) may connect the front substrate (310) and the rear substrate (320). The connection part (315) may electrically connect the front substrate (310) and the rear substrate (320). The connection part (315) may be an FPCB (Flexible Printed Circuit Board). The connection part (315) may be bent. The connection part (315) may have elasticity.

The substrate assembly (300) may include a rear substrate (320, hereinafter referred to as "second substrate"). The rear substrate (320) may supply an electric power to the front substrate (310). The rear substrate (320) may be called a "power PCB". The rear substrate (320) may be disposed in parallel with the front substrate (310). The rear substrate (320) may be spaced apart from the front substrate (310). The rear substrate (320) may be electrically connected to the connector (350).

The rear substrate (320) may include a lug (321). The lug (321) may be disposed on an outer circumference of rear substrate (320). At least a part of the lug (321) may be disposed on a hole (343*b*) of shield member (340). The lug (321) may include four surfaces disposed on the hole (343*b*) to face the extension part (343*a*). At this time, the said four surfaces of lug (321) may include a front surface facing a front side, a rear surface disposed at an opposite side of the front surface, and two side surfaces extending the rear surface and the front surface. At least one surface in the four surfaces of lug (321) in the present exemplary embodiment may be spaced apart from the extension part (343*a*). Furthermore, at least two surfaces in the four surfaces of lug (321) may be spaced apart from the extension part (343*a*). Alternatively, at least three surfaces in the four surfaces of lug (321) may be spaced apart from the extension part (343*a*). That is, a discrete space may be formed between the lug (321) and the extension part (343*a*) in the present exemplary embodiment. As illustrated in FIG. 7, a discrete space to an x axis direction and a discrete space to a z axis direction may be disposed between the lug (321) and the extension part (343*a*) in the present exemplary embodiment.

The lug (321) may include a first lug disposed on a first surface (external surface) of the rear substrate (320), and a second lug disposed on a second surface (external surface) of the rear substrate (320) disposed on an opposite side of the first surface. The rear substrate (320) may include a first groove disposed on two sides of first lug at an outer circumference of rear substrate (320), and a second groove disposed on two sides of second lug at an outer circumference of rear substrate (320). The rear substrate (320) may include a first groove disposed on a first surface (external surface) of the rear substrate (320), and a second groove disposed on second surface (external surface) of rear substrate (320) opposite to the first surface. At this time, the extension part (343*a*) may include a first extension part disposed on the first groove and a second extension part disposed on the second groove. At least one inner surface of an inner surface of the first extension part and an inner surface of the second extension part in the present exemplary embodiment may be spaced apart from the rear substrate (320). That is, a discrete space to a y axis direction (see FIG. 7) may be formed between the extension part (343*a*) and the rear substrate (320) in the present exemplary embodiment.

The lug (321) of rear body (200) can be inserted into the hole (343b) of the extension part (343a), even though there is a large accumulated tolerance between the front substrate (310) fixed to the front body (130) and the rear substrate (320) fixed to the rear body (200), by the discrete spaces to x axis direction, y axis direction and/or z axis direction between the rear substrate (320) and the extension part (343a) as explained above.

The rear substrate (320) may include three lugs (321). The lug (321) may be disposed only three side surfaces of four side surfaces of rear substrate (320). One side surface of the four side surfaces of rear substrate (320) may not be disposed with a lug (321). At this time, the shield member (340) may include three extension parts (343a) respectively coupled with the three lugs (321). The extension part (343a) may be extended to a fourth surface (rear surface) of body part (341). Each of the three body parts (341) of the four body parts (341) at the shield member (340) may be disposed with an extension part (343a), and the remaining body part (341) may be disposed with a cut-out part. The cut-out part may be a portion formed by removing a bar (345). The cut-out part may be more recessed than the fourth surface. As illustrated in FIG. 13(c), a discrete groove (345b) may be disposed between the cut-out part and the fourth surface.

The substrate assembly (300) may include an image sensor (330). The image sensor (330) may be disposed on the front substrate (310). The image sensor (330) may be electrically connected to the front substrate (310). The image sensor (330) may be coupled to the front substrate (310) by way of SMT (Surface Mounting Technology). In another example, the image sensor (330) may be coupled to the front substrate (310) by way of flip chip technology. The image sensor (330) may be so disposed as to be matched to the lens (110) in terms of optical axis. That is, an optical axis of image sensor (330) and an optical axis of lens (110) may be aligned. The image sensor (330) may convert a light irradiated on an effective image region of the image sensor (330) to an electric signal. The image sensor (330) may be any one of CCD (charge coupled device, MOS (metal oxide semi-conductor), CPD and CID.

The substrate assembly (300) may include a shield member (340). The shield member (340) may fix the front substrate (310) and the rear substrate (320). The shield member (340) may be coupled to the front substrate (310) and to the rear substrate (320). The shield member (340) may be so disposed as to allow the front substrate (310) and the rear substrate (320) to be spaced apart. The shield member (340) may be directly coupled to a rear surface of the front substrate (310). The rear substrate (320) and the shield member (340) may be coupled by allowing a lug of the rear substrate (320) to be inserted into a hole (343b) of a coupling part (343) at the shield member (340). The shield member (340) may be formed with a metal. At this time, the shield member (340) may be called a "shield can".

The shield member (340) in the present exemplary embodiment may be integrally formed. The shield member (340) in the present exemplary embodiment may be formed by allowing a whole-bodied plate material to be bent. The shield member (340) in the present exemplary embodiment may be formed by allowing four body parts (341) to be bent relative to four connection parts (344)(bridge), and by allowing a first slant part (343c) and a second slant part (343d) to be bent. A bar (345) used when the shield member (340) and the front substrate (310) are coupled may be removed after coupling between the shield member (340) and the front substrate (310).

The coupling among the shield member (340), the front substrate (310) and the rear substrate (320) in the present exemplary embodiment may be implemented by the following sequence.

First, the lug (342) of shield member (340) may be coupled to a rear surface {a surface facing the rear substrate (320), a surface disposed on an opposite side of third surface facing the front body (130)} of front substrate (310). At this time, the lug (342) of shield member (340) may be coupled to a rear surface of front substrate (310) by way of SMT (Surface Mounter Technology). At this time, a front surface {third surface facing the front body (130)} of front substrate (310) may be in a state of the image sensor (330) being mounted. After the front substrate (310) is mounted with the image sensor (330), the shield member (340) may be coupled to the front substrate (310), and the front substrate (310) is first mounted with the shield member (340), and then the front substrate (310) may be mounted with the image sensor (330).

Successively, a front surface of front substrate (310) may be fixed by the front body assembly (100) using an adhesive (600). At this time, an alignment between the lens (110) and the image sensor (330) may be adjusted. Under this process, an AA (Active Alignment) may be conducted between the lens (110) and the image sensor (330). However, in a modification, the front substrate (310) may be coupled to the shield member (340) after the front substrate (310) and the front body assembly (100) are coupled.

Thereafter, the extension (315, which is an FPCB) extended from the front substrate (310) is bent to allow the rear substrate (320) to be pushed into three holes (343b) of shield member (340). At this time, a rear surface of rear substrate (320) may be in a state of the connector (350) being coupled. It should be apparent that the connector (350) may be simultaneously coupled in the subsequent process of the cover (400) being coupled.

The shield member (340) may include a body part (341). The body part (341) may be coupled to the front substrate (310). The body part (341) may be a metal plate. The body part (341) may be disposed in the number of four (4). The body part (341) may be disposed in four pieces, each mutually spaced apart. At this time, four pieces of body part (341) may respectively form a 90° with an adjacent body part (341). The body part (341) may be connected by the connection part (344). Three pieces of body part (341) of four pieces of body part (341) may be disposed with a coupling part (343) coupled by the rear substrate (320), and the remaining one piece of body part (341) may be disposed with a bar (345).

The shield member (340) may include a lug (342). The lug (342) may be protruded from a front end of the body part (341). Each two pieces of lug (342) may be disposed on a single body part (341), each mutually spaced apart. That is, a total of eight (8) lugs (342) are disposed on a total of four (4) pieces of body part (341). The shield member (340) may include two lugs (342) for each body part (341) with a view to increasing the disengagement strength between the shield member (340) and the front substrate (310) when the shield member (340) and the front substrate (310) are coupled. At this time, the disengagement strength may mean SMD disengagement strength. Meantime, two lugs (342) disposed at each body part (341) may be mutually spaced apart. That is, a gap may be formed between two lugs (342). When a straight type is applied where no gap is formed between the lugs (342), there may be an influence on tensile force due to transformation caused by bend or processing of the shield member (340). Although the foregoing discussion has explained the lug (342) as a configuration separate from the body part (341), the lug (342) may be interpreted as one element of body part (341).

The shield member (340) may include a coupling part (343). The coupling part (343) may be coupled with a rear substrate (320). The coupling part (343) may be extended from the body part (341). The coupling part (343) may be protruded from a rear end of the body part (341). The coupling part (343) may be disposed in the number of three (3) pieces, and may be respectively disposed on three pieces of body part (341). That is, one of the four pieces of body part (341) may not be disposed with the coupling part (343). The three pieces of coupling part (343) may be coupled to three side surfaces of rear substrate (320). The coupling part (343) may be brought into contact with a side plate (420) of cover (400). The coupling part (343) may be electrically connected to the side plate (420) of cover (400).

The coupling part (343) may include a first coupling part including a third surface (inner lateral surface) facing the rear substrate (320) and disposed on a first groove, and a second coupling part including a fourth surface (inner lateral surface) facing the rear substrate (320) and disposed on a second groove. At this time, at least one of the third surface of first coupling part and the fourth surface of the second coupling part may be spaced apart from the rear substrate (320).

The coupling part (343) may include an extension part (343a). The extension part (343a) may be extended from the body part (341). The extension part (343a) may be protruded from a rear end of the body part (341). The extension part (343a) may be rearwardly protruded from a part of the body part (341). A width of extension part (343a) may be 40~70% of a width of the body part (341). The extension part (343a) may be disposed with a hole (343b).

The coupling part (343) may include a hole (343b). The hole (343b) may be disposed on the extension part (343a). The hole (343b) may be coupled by the rear substrate (320). The hole (343b) may be coupled by a lug of the rear substrate (320). The hole (343b) may be greater than the lug of rear substrate (320). That is, a discrete space (gap) may be formed between the coupling part (343) and the rear substrate (320) disposed on the hole (343b). The front substrate (310) and the shield member (340) in the present exemplary embodiment may be coupled to the front body (130), and the rear substrate (320) and the connector (350) may be coupled to the cover (400) and the rear body (200). A discrete space between the shield member (340) and the rear substrate (320) in the present exemplary embodiment may be formed to x axis, y axis and z axis directions. Through this configuration, the rear substrate (320) may be fixed by the connector (350), and the connector (350) may be fixed by the pressing unit (412) of cover (400), and even if there is a manufacturing tolerance on the shield member (340) and the rear substrate (320), the rear substrate (320) can be coupled to the shield member (340). As a comparative example, if the size of hole (343b) of shield member (340) is same as the size of lug of the rear substrate (320), the lug of rear substrate (320) may not be inserted into the hole (343b) of shield member (340). This is because the rear substrate (320) is fixed to the rear body (200) and the shield member (340) is fixed to the front body (130).

The coupling part (343) may include a first slant part (343c). The first slant part (343c) may be outwardly and slantly extended from the extension part (343a). The first slant part (343c) may be outwardly bent relative to the extension part (343a). The first slant part (343c) may be slantly extended from the extension part (343a). The coupling part (343) may include a second slant part (343d). The second slant part (343d) may be inwardly and slantly extended from the first slant part (343c). The second slant part (343d) may be inwardly bent relative to the first slant part (343c). Alternatively, at least a part of the second slant part (343d) may be disposed in parallel with the extension part (343a). It is easy to insert the rear substrate (320) into the hole (343b) of coupling part (343) and it is also easy to remove the rear substrate (320) by the shape of the first slant part (343c) and the second slant part (343d) according to the present exemplary embodiment. When the rear substrate (320) is pressed toward the body part (341) of shield member (340), the lug of rear substrate (320) is inserted in the hole (343b) by riding down the first slant part (343c). Furthermore, when the second slant part (343d) is grasped and outwardly pulled, the lug of the rear substrate (320) may be easily removed from the hole (343b).

The shield member (340) may include a connection part (344). The shield member (340) may include four connection parts (344) connecting four pieces of body part (341). The connection part (344) may be disposed at each corner of the shield member (340). The connection part (344) may be formed with a bridge shape in order to manufacturing process simplication (shape realization using only bending) of shield member (340) and quality improvement. At this time, the connection part (344) may be called a "bridge".

The shield member (340) may include a bar (345). The bar (345) may be used for grasping the shield member (340) when the front substrate (310) is coupled by the shield member (340). Thereafter, when the coupling of shield member (340) to the front substrate (310) is completed, the bar (345) may be removed. The bar (345) may be formed by being bent from the body part (341). The bar (345), as illustrated in the first exemplary embodiment of FIG. 13(a), may be bent from the body part (341) to allow a rear surface (surface facing the rear substrate (320)) not to protrude over a rear end of the body part (341). At this time, a discrete groove (345b) may be disposed at the bar (345) and two sides of connection part of body part (341). Alternatively, the bar, as illustrated in the second exemplary embodiment of FIG. 13(b), may be so disposed as to allow a rear end to protrude over the rear end of the body part (341) as much as a thickness of bar (345). At this time, the discrete groove (345b) may be omitted. Meantime, the shape may look like the shape as shown in FIG. 13(c), after the bar (345) of the first exemplary embodiment is removed. The rear end of the body part (341) where the bar (345) used to be may be more recessed than the rear end of the body part (341). Meantime, albeit not being illustrated by a separate drawing, when the bar (345) according to the second exemplary embodiment is removed, a rear end of the body part (341) may be extended for a predetermined level at an area different from an area used to be formed with the bar (345). The shield member (340) may include a cut-out part that is formed as a result of removal of bar (345).

The shield member (340) may include a guide groove (345a, hereinafter referred to as "first groove"). The guide groove (345a) may be disposed to facilitate the cutting of bar (345) after coupling of shield member (340) to the front substrate (310). The guide groove (345a) may include a V-shaped cross-section.

The shield member (340) may include a discrete groove (345b, hereinafter referred to as "second groove"). The discrete groove (345b) may be formed on two sides of an area where the bar (345) and the body part (341) are connected in the first exemplary embodiment. The discrete groove (345b) may be a U-shaped groove. A cut-out part {an area where the bar (345) is cut out} of body part (341) may be disposed between two discrete grooves (345b). The discrete groove (345b) may be omitted from the second exemplary embodiment.

The shield member (340) may include a removal part (346). Although the removal part (346) may be existent in the manufacturing process as illustrated in FIG. 19, the removal part (346) may be an area that is to be removed in the assembly process. The shield member (340) may include a groove (347) formed at two sides of an area where the removal part (346) and the connection part (344) are met. At this time, a width {see FIG. 19(a)} of the groove (347) may be 0.27 mm. A depth {see FIG. 19(b)} of the groove (347) may be 0.05 mm. A curvature {see FIG. 19(c)} of the groove (347) may be R0.20 mm.

The substrate assembly (300) may include a connector (350). The connector (350) may be coupled to the rear substrate (320). The connector (350) may be fixed to the rear substrate (320). The connector (350) may be electrically connected to the rear substrate (320). The connector (350) may be fixed to the cover (400). The connector (350) may be fixed to the rear body (200). The connector (350) may be coupled to the rear body (200). The connector (350) may pass through a hole (411) of cover (400) and a hole of the rear body (200). The connector (350) may be outwardly extracted through a connector extraction part (230) of rear body (200). The connector (350) may be extended from the rear substrate (320) and may pass through the rear body (200).

The camera module may include a cover (400). The cover (400) may be fixed to an inner surface of rear body (200). The cover (400) may be disposed inside of the rear body (200). The cover (400) may be fixed into the rear body (200). The cover (400) may be formed with a metal. At this time, the cover (400) may be called a "rear shield can". The cover (400) may be formed by allowing a metal plate to be bent. The cover (400) may be grounded to the rear substrate (320). An external surface of cover (400) and the connector (350) may be grounded. The cover (400) may shield an EMI (electromagnetic interference) or electromagnetic wave.

The cover (400) may include a bottom plate (410). The bottom plate (410) may be disposed on a bottom part (210) of rear body (200). The bottom plate (410) may include a hole (411). The hole (411) of bottom plate (410) may be passed through by the connector (350). The bottom plate (410) may include a hole (411) disposed with the connector (350).

The cover (400) may include a tension structure. The doubly-formed tension structure of cover (400) may press the connector (350). The tension structure of cover (400) may push the connector (350) to a center and may simultaneously downwardly push the connector (350).

The connector (350) may be fixed through the pressing unit (412, tension structure) of cover (400) in the present exemplary embodiment. At this time, the hole (343b) of coupling part (343) at the shield member (340) may be so formed as to provide a sufficient tolerance to a coupled area with the rear substrate (320), such that even if there is generated an accumulated tolerance between the rear substrate (320) and the shield member (340), the phenomenon of a concentricity of connector (350) relative to the rear substrate (320) being twisted can be prevented.

The cover (400) may include a pressing unit (412) disposed on the bottom plate (410) to elastically support the connector (350). The bottom plate (410) may include the pressing unit (412). The pressing unit (412) may be interpreted as one element of bottom plate (410), or alternatively, the pressing unit (412) may be interpreted as an element separate from the bottom plate (410). The pressing unit (412) may press the connector (350). The pressing unit (412) may elastically press the connector (350). The pressing unit (412) may fix the connector (350). The pressing unit (412) may include a first pressing part (412a). The first pressing part (412a) may support a rear side {a surface facing the bottom plate (410) of cover (400)} of connector (350). The first pressing part (412a) may press the connector (350) toward a front side (direction facing the rear substrate (320)}. That is, the first pressing part (412a) may press the connector (350) toward the rear substrate (320). The pressing unit (412) may include a second pressing part (412b). The second pressing part (412b) may support an outer circumferential surface of connector (350). The second pressing part (412b) may press the connector (350) toward a center of hole (411) of bottom plate (410). The pressing unit (412) may include four pressing pieces, each mutually spaced apart. The said four pieces may be equidistantly disposed on a circumference of second surface (external lateral surface) of connector (350). Each of the said four pieces may be disposed at a 90° relative to an adjacent other pressing piece. Each of the four pressing pieces may include a first pressing part (412a) and a second pressing part (412b). In a modification, the pressing unit (412) may be formed with two pressing pieces. In another modification, the pressing unit (412) may be formed with eight (8) pressing pieces. In the modification, the pressing unit (412) may include a plurality of pressing pieces, and a part of the plurality of pressing pieces may be formed as a first pressing part (412a), and the remaining other plurality of pressing pieces may be formed as a second pressing part (412b). That is, the first pressing part (412a) and the second pressing part (412b) may be separately formed in the modification.

The pressing unit (412) may include a first pressing part (412a) pressing a first surface (rear surface) of connector (350), and a second pressing part pressing a second surface (external lateral surface) of connector (350). At this time, the connector (350) may include a first surface (rear surface) facing an inner surface of the bottom plate (410) of cover (400), and a second surface (external lateral surface) extended from the first surface and disposed on the hole (411). The pressing unit (412) may include a first pressing part (412a) pressing the connector (350) to a first direction (front side), and a second pressing part (412b) pressing the connector (350) to a second direction (inner side) different from the first direction. That is, the pressing unit (412) in the present exemplary embodiment may press the connector (350) to at least two or more directions. Through this configuration, the connector (350) can be securely fixed to a bottom plate (410) of cover (400).

The first pressing part (412a) and the second pressing part (412b) may be integrally formed. That is, a part of the bottom plate (410) may be cut out and bent to form the first pressing part (412a) and the second pressing part (412b). An area cut out from the bottom plate (410) may be initially bent to form the first pressing part (412a), and the initially bent area may be secondly bent to form the second pressing part (412b).

The pressing unit (412) may include a first extension part slantly and inwardly extended from the bottom plate (410), a first contact part extended from the first extension part to contact a first surface (rear surface) of connector (350), and a second extension part slantly extended from the first contact part toward the hole (411). Additionally, the pressing unit (412) may further include a second contact part extended from the second extension part to contact a second surface (external lateral surface) of connector (350), and a third extension part outwardly and slantly extended from the second contact part.

The cover (400) may include a side plate (420). The side plate (420) may be brought into contact with the shield member (340). An inner surface of side plate (420) may be brought into contact with a coupling part (343) of shield member (340). Through the said configuration, the shield member (340) and the cover (400) may be grounded. The side plate (420) of cover (400) and the coupling part (343) of shield member (340) may be brought into contact at three points. The side plate (420) may be extended from the bottom plate (410). The side plate (420) may be extended from an outer circumference or an edge of bottom plate (410). The side plate (420) may include four side plates (420). The said four side plates (420) may be correspondingly disposed at four side parts (220) of rear body (200). A front end/distal end of side plate (420) may be overlapped with the front substrate (310) to a direction perpendicular to an optical axis of lens (110).

The camera module may include a bracket (500). The bracket (500) may be used for fixing the camera module to a vehicle. The bracket (500) may be coupled with the rear body (200). The bracket (500) may be fixed to a vehicle and the like.

The bracket (500) in the present exemplary embodiment may be coupled to an outer surface of the rear body (200). At this time, the outer surface of rear body (200) may include a first surface (rear surface) disposed opposite to the front body (130), and a second surface (external lateral surface) connecting the first surface and the front body (130). Furthermore, the outer surface of rear body (200) may include a third surface (external lateral surface) disposed at an opposite side of second surface. The outer surface of rear body (200) may include a fourth surface (external lateral surface) and a fifth surface (external lateral surface) interposed between the second surface and the third surface and mutually oppositely disposed. That is, the outer surface of rear body (200) may include one rear surface and four external lateral surfaces.

The bracket (500) may include a bottom part (510). The bottom part (510) may face a first surface (rear surface) of rear body (200). The bottom part (510) may be disposed at a position corresponding to that of the bottom part (210) of rear body (200). The bottom part (510) may include a hole that is passed through by the connector (350).

The bracket (500) may include a pressing part (511). The pressing part (511) may be disposed on the bottom part (510) to press a first surface (rear surface) of rear body (200) toward a front side. The pressing part (511) may support a rear surface of rear body (200). The bottom part (510) may include a pressing part (511). The pressing part (511) may have elasticity. At this time, the pressing part (511) may be called a "tension structure". The pressing part (511) may be disposed at two points. The said two pressing parts (511) may be so extended from the bottom part (510) as to mutually form a 90°. The pressing part (511) may include a first pressing part disposed toward a first direction, and a second pressing part disposed toward a second direction different from the first direction. At this time, the first direction may be perpendicular to the second direction. The pressing part (511) may press the bottom part (210) of rear body (200) toward a front side {direction toward the front body (130)}. Through this configuration, a hook coupling between the lugs (224) and the hook (521) can be securely maintained.

The pressing part (511) in the present exemplary embodiment may be integrally formed with the bottom part (510). The pressing part (511) may include a first extension part extended from the bottom part (510) toward a rear surface (first surface) of rear body (200), a contact part extended from the first extension part to contact a rear surface of rear body (200), and a second extension part extended from the contact part toward a direction distancing from the rear surface of rear body (200).

The bracket (500) may include a side part (520). The side part (520) may be disposed on a second surface (external lateral surface) of rear body (200). The side part (520) may be extended from an outer circumference or edge of the bottom part (510). The side part (520) may include four side parts (520). At this time, two mutually opposite two side parts (520) may include a hook (521). At this time, the other side parts (520) may include a hole (522).

The side part (520) of bracket (500) may include a coupling part (523) respectively disposed on two external lateral surfaces (fourth surface, fifth surface) out of four external lateral surfaces of rear body (200) and including a hole (522). The coupling part (523) may be coupled to a vehicle.

The bracket (500) may include a hook (521) disposed on the side part (520) to be hitched by the lug (224) of the rear body (200). The hook (521) may be extended from the bottom part (510). The side part (520) may include a hook (521). The hook (521) may be coupled with the lug (224) of rear body (200). The side part (520) of bracket (500) may include two hooks (521) on each two surfaces. That is, a total of four hooks (521) may be disposed. At this time, two hooks (521) may be disposed opposite to the other two hooks (521). A rib (225) of rear body (200) may be interposed between two hooks (521). A horizontal (left/right) gap (room) may be adjusted and guided by the said two hooks (521) and the rib (225) at the time of assembly. The rear body (200) in the present exemplary embodiment may include a first lug and a second lug disposed on an external lateral surface of rear body (200), each mutually and oppositely disposed. At this time, the hook (521) may be hitched by the first lug and the second lug respectively. In other words, the hook (521) may include a first hook hitched by the first lug and a second hook hitched by the second lug.

The side part (520) may include a hole (522). The hole (522) may be formed to allow a fixing member (not shown) fixed to a vehicle to be coupled. For example, the hole (522) may be coupled by a screw. At this time, the hole (522) may be called a "screw hole". A total of four holes (522) may be disposed, two holes for a side part (520), and two holes for oppositely disposed side part (520).

The camera module may include an adhesive (600). The adhesive (600) may fix the front body assembly (100) and the front substrate (310). The adhesive (600) may be disposed between an inner protrusion (132) of front body (130) and a front surface of front substrate (310). An active alignment between the lens (110) and the image sensor (330) can be implemented in the present exemplary embodiment. To be more specific, an optical axis alignment between the lens (110) and the image sensor (330) may be adjusted while the adhesive (600) is initially cured (hardened), and then the final curing of adhesive (600) may be processed. The adhesive (600) may be cured by heat and/or UV.

It should be interpreted that the terms such as "includes", "including", "have", "having", "comprises" and/or "comprising" as used herein mean that the relevant elements are embedded, unless otherwise described, such that the mentioned elements are not excluded but may be further included. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein. The foregoing various exemplary embodiments of the present invention and explanations are intended only to be illustrative of the technical ideas of the present invention, and therefore, it should be appreciated by the skilled in the art that various modifications and amendments to the above examples may be made without deviating from the scope of protection of the invention.

Thus, the exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being included in the scope of right of the present invention.

The invention claimed is:
1. A camera module, comprising:
a front body;
a lens disposed on the front body;
a rear body coupled to the front body;
a substrate disposed at an inner space between the front body and the rear body; and
an image sensor disposed on the substrate,
wherein the front body comprises a first surface facing the rear body, and a first protrusion and a second protrusion protruded from the first surface and spaced apart from each other,
wherein the first protrusion is disposed at an inner side of the second protrusion to allow being nearer to an optical axis than the second protrusion,
wherein the first protrusion is coupled with the first substrate and the second protrusion is coupled with the rear body, and
wherein the front body further comprises a plurality of ribs connecting the first protrusion and the second protrusion between the first protrusion and the second protrusion and mutually spaced apart from the other.
2. The camera module of claim 1, wherein the second protrusion is spaced apart from an outer circumference of the first surface of the front body,
wherein the rear body comprises a bottom part spaced apart from the front body, and a side part extended from the bottom part toward the front body,
wherein the side part of the rear body comprises a second surface facing the front body, a third protrusion protrused from the second surface and disposed at a position corresponding to that between the second protrusion and the outer circumference of the first surface at the front body, and a fourth protrusion slantly connecting an inner surface of the third protrusion and the second surface, and
wherein the front body and the rear body are coupled by the second protrusion and the fourth protrusion being fused.

3. The camera module of claim 2, wherein the rear body comprises a groove disposed at an outer circumference of the third protrusion and extended to a distal end of the third protrusion.
4. The camera module of claim 1, wherein the second protrusion of the front body and the fourth protrusion of the rear body are integrated by ultrasonic fusion.
5. The camera module of claim 1, wherein a distance between a distal end of the first protrusion and the first surface is longer than a distance between a distal end of the second protrusion and the first surface,
wherein the rib is extended from the first surface of front body,
wherein the rib comprises a slant surface so slanted as to allow a distance at the first protrusion between a distal end of the rib and the first surface is formed to be longer than a distance at the second protrusion between a distal end of the rib and the first surface.
6. The camera module of claim 1, wherein the substrate comprises a third surface facing the front body, and
wherein a distal surface of the first protrusion is fixed to the third surface of the substrate by an adhesive.
7. The camera module of claim 6, wherein size of an outer circumference at the first protrusion is smaller than size of an outer circumference of the third surface at the substrate.
8. The camera module of claim 1, wherein the lens and the front body are integrally formed.
9. The camera module of claim 1, wherein each of the first protrusion and the second protrusion are extended from the first surface so as to allow a cross-section to form a single closed curve shape.
10. The camera module of claim 1, comprising:
a second substrate spaced apart from the substrate in the inner space and electrically connected to the first substrate;
a connector coupled to the second substrate; and
a cover fixed in the rear body,
wherein the cover comprises a bottom plate comprising a hole in which the connector is disposed, a side plate extending from the bottom plate, and a pressing unit disposed on the bottom plate to elastically support the connector,
wherein the connector comprises a first surface facing an inner surface of the bottom plate of the cover, and a second surface extending from the first surface and disposed on the hole, and
wherein the pressing unit comprises a first pressing part pressing athe first surface of the connector and a second pressing part pressing athe second surface of the connector.
11. The camera module of claim 10, wherein the pressing unit comprises a first extension part inwardly slantly extending from the bottom plate, a first contact part extending from the first extension part and contacted with the first surface of the connector, a second extension part slantly extending toward the hole from the first contact part, and a second contact part extending from the second extension part and contacted the second surface of the connector, and
wherein the first surface of the connector is a rear surface of the connector, and the second surface of the connector is an external lateral surface of the connector.
12. The camera module of claim 11, wherein the pressing unit further comprises a third extension part outwardly slantly extending from the second pressing part.
13. The camera module of claim 10, wherein the cover and an outer surface of connector are grounded.

14. The camera module of claim 10, comprising a shield member which the substrate and the second substrate are coupled,
   wherein the shield member comprises a body part coupled to the first substrate, an extension part extending from the body part, and a hole disposed on the extension part,
   wherein the second substrate comprises a lug which at least a part thereof disposed on the hole, and
   wherein the lug comprises four surfaces disposed on the hole and facing the extension part and
   wherein at least one surface of the four surfaces of the lug is spaced apart from the extension part.

15. The camera module of claim 10, comprising a shield member disposed between the first substrate and the second substrate,
   wherein the shield member comprises a body part and an extension part extending from the body part of the shield member,
   wherein the extension part comprises two extension parts disposed opposite each other, and
   wherein at least some of each of the two extension parts is in contact with an inner surface of the side plate of the cover.

16. The camera module of claim 15, wherein the extension part of the shield member comprises a hole,
   wherein the second substrate comprises a protrusion formed at a position corresponding to the hole of the shield member,
   wherein the protrusion of the second substrate is disposed in the hole of the extension part of the shield member, and
   wherein the second substrate is grounded by the shield member.

17. The camera module of claim 1, comprising a bracket coupled to an outer surface of the rear body,
   wherein the outer surface of the rear body comprises a first surface disposed opposite the front body, and a second surface connecting the first surface and the front body,
   wherein the rear body comprises a lug disposed on the second surface, and
   wherein the bracket comprises a bottom part facing the first surface of the rear body, a pressing part disposed on the bottom part to press the first surface of the rear body, four side parts disposed on the second surface of the rear body, and a hole disposed on each of the four side parts for fixing the camera module to a vehicle.

18. A camera module, comprising:
   a front body;
   a barrel disposed on the front body;
   a front body assembly comprising a lens disposed on the barrel;
   a rear body coupled with the front body assembly;
   a substrate disposed at an inner space between the front body assembly and the rear body; and
   an image sensor disposed on the substrate,
   wherein the front body assembly comprises a first surface facing the rear body, a first protrusion and a second protrusion protruded from the first surface and each spaced apart, and a rib connecting the first protrusion and the second protrusion,
   wherein the first protrusion is disposed at an inside of the second protrusion to allow being nearer to an optical axis than the second protrusion, and the first protrusion is coupled with the substrate, and the second protrusion is coupled with the rear body, and
   wherein the rib is formed with a plural number, each spaced apart, and a plurality of discrete spaces is formed among the plurality of ribs.

19. The camera module of claim 18, wherein the second protrusion is spaced apart from an outer circumference of the first surface of the front body,
   wherein the rear body comprises a bottom part spaced apart from the front body, and a side part extended from the bottom part toward the front body,
   wherein the side part of the rear body comprises a second surface facing the front body, a third protrusion protrused from the second surface and disposed at a position corresponding to that between the second protrusion and the outer circumference of the first surface at the front body, and a fourth protrusion slantly connecting an inner surface of the third protrusion and the second surface, and
   wherein the front body and the rear body are coupled by the second protrusion and the fourth protrusion being fused.

20. The camera module of claim 18, wherein a distance between a distal end of the first protrusion and the first surface is longer than a distance between a distal end of the second protrusion and the first surface,
   wherein the rib is extended from the first surface of front body,
   wherein the rib comprises a slant surface so slanted as to allow a distance at the first protrusion between a distal end of the rib and the first surface is formed to be longer than a distance at the second protrusion between a distal end of the rib and the first surface.

* * * * *